(12) United States Patent
Maeno et al.

(10) Patent No.: US 6,404,104 B1
(45) Date of Patent: Jun. 11, 2002

(54) VIBRATION TYPE ACTUATOR AND VIBRATION TYPE DRIVING APPARATUS

(75) Inventors: Takashi Maeno, Kawasaki; Kenjiro Takemura, Musashino; Ichiro Okumura, Matsudo; Nobuyuki Kojima, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/197,425

(22) Filed: Nov. 23, 1998

(30) Foreign Application Priority Data

| Nov. 27, 1997 | (JP) | ............................................. 9-326381 |
| Nov. 27, 1997 | (JP) | ............................................. 9-326382 |
| Nov. 27, 1997 | (JP) | ............................................. 9-326383 |
| Nov. 27, 1997 | (JP) | ............................................. 9-326384 |
| Mar. 23, 1998 | (JP) | .......................................... 10-074698 |
| Mar. 23, 1998 | (JP) | .......................................... 10-074699 |
| Mar. 23, 1998 | (JP) | .......................................... 10-074700 |

(51) Int. Cl.$^7$ ................................................ H02N 2/00
(52) U.S. Cl. ........................... 310/323.02; 310/313.03; 310/313.14; 310/313.13
(58) Field of Search ........................ 310/323.01–323.02, 310/323.03, 323.14, 323.13, 323.06

(56) References Cited

U.S. PATENT DOCUMENTS

| 4,436,188 A | * | 3/1984 | Jones | ........................ 188/378 |
| 4,678,955 A | * | 7/1987 | Toda | ........................... 310/328 |
| 4,703,214 A | * | 10/1987 | Mishiro | ..................... 310/323 |
| 4,705,980 A | * | 11/1987 | Mishiro | ..................... 310/323 |
| 4,728,843 A | * | 3/1988 | Mishiro | ..................... 310/323 |
| 4,864,904 A | * | 9/1989 | Mishiro | ......................... 82/137 |
| 4,893,046 A | * | 1/1990 | Honda | ........................ 310/323 |
| 4,911,044 A | * | 3/1990 | Mishiro et al. | ............... 82/158 |
| 5,017,820 A | * | 5/1991 | Culp | ........................... 310/328 |
| 5,128,580 A | | 7/1992 | Maeno et al. | ................ 310/323 |
| 5,155,407 A | | 10/1992 | Kimura et al. | ............... 310/323 |
| 5,158,493 A | * | 10/1992 | Morgrey | ..................... 446/355 |
| 5,274,295 A | | 12/1993 | Tsukimoto | .................... 310/323 |
| 5,281,899 A | * | 1/1994 | Culp | ............................ 319/116 |
| 5,298,829 A | | 3/1994 | Tsukimoto | .................... 310/323 |
| 5,355,755 A | * | 10/1994 | Sakata et al. | ................... 83/875 |
| 5,410,204 A | * | 4/1995 | Imabayashi et al. | ......... 310/323 |
| 5,436,522 A | | 7/1995 | Tsukimoto | .................... 310/323 |
| 5,506,462 A | * | 4/1996 | Tamai et al. | ................. 310/323 |
| 5,585,685 A | | 12/1996 | Maeno et al. | ................ 310/323 |
| 5,646,469 A | | 7/1997 | Tsukimoto | .................... 310/323 |
| 5,739,621 A | | 4/1998 | Atsuta et al. | ................. 310/316 |
| 5,770,916 A | | 6/1998 | Ezaki et al. | ................. 310/366 |
| 5,854,529 A | * | 12/1998 | Ashizawa et al. | ........... 310/323 |
| 5,872,417 A | | 2/1999 | Sugaya | ........................ 310/323 |
| 5,994,818 A | * | 11/1999 | Abramov et al. | ....... 310/323.01 |
| 6,184,609 B1 | * | 2/2001 | Johansson et al. | ........... 310/328 |

FOREIGN PATENT DOCUMENTS

| EP | 0 360 975 | 4/1990 | ............ H01L/41/08 |
| EP | 0 453 826 | 10/1991 | ............... B25J/9/12 |
| FR | 2 336 056 | * 7/1977 | ............ G05B/19/00 |
| JP | 61-015572 | 1/1986 | |
| JP | 3-256575 | 11/1991 | ............. B65H/3/00 |
| JP | 3-272927 | 12/1991 | ............. H02N/2/00 |
| JP | 09-219980 | 8/1997 | ............. H02N/2/00 |

OTHER PUBLICATIONS

English Translation of the Official Communication dated Mar. 14, 2001.
Foreign Language Search Report (dated Mar. 14, 2001).

* cited by examiner

*Primary Examiner*—Thomas M. Dougherty
(74) *Attorney, Agent, or Firm*—Fitzpatrick, Cella, Harper & Scinto

(57) ABSTRACT

A vibration type actuator comprises a vibration member for generating vibration displacements in at least three different directions and a contact member in contact with the vibration member. In the actuator the vibration displacements in at least three different directions are excited in the vibration member to generate synthetic vibrations that cause relative movement between the vibration member and contact member in a desired direction.

13 Claims, 20 Drawing Sheets

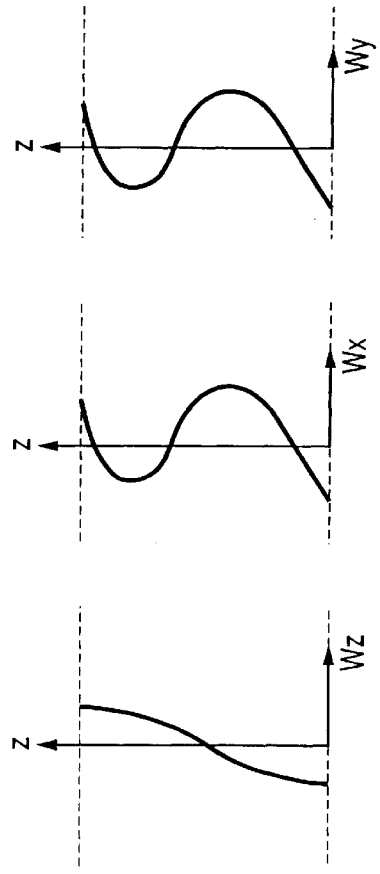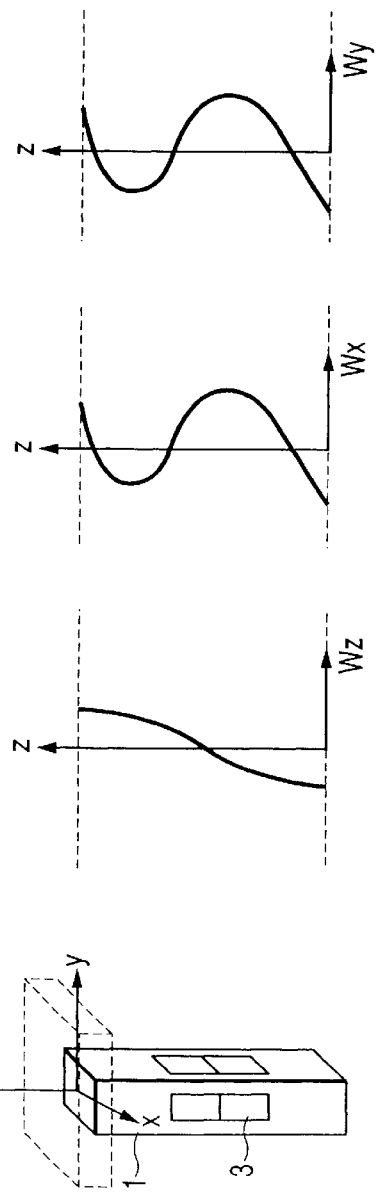

VIBRATION TYPE ACTUATOR AND VIBRATION TYPE DRIVING APPARATUS

BACKGROUND OF THE INVENTION

1. Field of the Invention

The present invention relates to a vibration type actuator and a vibration type driving apparatus, respectively utilizing vibrations.

2. Related Background Art

As a vibration type actuator for producing a motion about a multi-axis, a spherical vibration type actuator has been proposed as disclosed, for example, in Journal of Seimitsu Kougaku Kai, Vol. 61, No. 3, pp. 1227–1230, 1995 or NIKKEI MECHANICAL, No. 5, pp. 26–27, Apr. 28, 1997.

Such a spherical vibration type actuator rotates a spherical moving member (rotor) about two axes or three axes among three axes intersecting at a right angle. A plurality of vibration members (stators) each producing a rotation force about one axis by using vibrations (e.g., travelling waves) are disposed in pressure contact with the moving member.

Such spherical vibration type actuators now under development include a two-degree of freedom type using four vibration members and a three-degree of freedom type using three vibration members.

An example of the vibration member used by a spherical vibration type actuator is a vibration member of a ring vibration type actuator used for driving an auto focus lens of a camera. FIG. 16 is a perspective view of this vibration member. The vibration member 19 has a ring elastic member 19a whose bottom is formed with piezoelectric elements 9b made of piezoelectric ceramic. The piezoelectric elements are formed with two-phase driving elements having a proper phase difference (an odd number multiple of a half wave). These two-phase driving elements are driven by alternating signals having a proper phase difference (e.g., 90°), so that flexural (bending) travelling waves are formed in the elastic member 19a along its circumferential direction. An unrepresented contact member is made in contact with the elastic member 19a by unrepresented pressure means, so that the contact member and vibrating member are provided with a relative motion along the direction opposite to the direction of travelling waves. If the vibrating member 19 is fixed, the contact member rotates as the moving member.

In a spherical vibration type actuator, for example, in a two-degree of freedom type spherical vibration actuator such as shown in FIG. 17, two pairs of opposing vibrating members 19 are disposed around a spherical moving member 2 to realize a two-degree of freedom motion by using the center lines of the vibrating members 19 as rotation axes.

As another example of the vibration type actuator producing a motion about a multi-axis, a piezoelectric manipulator has been proposed as described in a paper pp. V9–K15, Third International Conference on Motion and Vibration Control, Chiba, Sep. 1, 1996. The structure of this piezoelectric manipulator is shown in FIG. 18.

As shown, the piezoelectric manipulator is constituted of a vibration member 19 and semispherical moving members 20a and 20b mounted on the vibration member 19 at opposite ends thereof along its axial direction. The vibration member 19 is constituted of a cylindrical elastic member and piezoelectric elements. Unrepresented divided electrodes are formed around the vibration member 19. The semispherical moving members 20a and 20b are attracted toward each other by a spring 21 provided in the vibration member 19, so that the vibration members 20a and 20b are always in contact with the opposite opening ends of the vibration member 19.

By applying proper alternating signals to the divided electrodes so as to adjust vibrations to be excited by the vibration member 19, the semispherical moving members 20a and 20b in contact with the opening ends of the vibration member 19 are driven by the single vibrating member 19.

According to the drive principle, an ellipsoidal motion is formed at contact points between the semispherical moving members 20a and 20b and the vibration member 19. By changing an alternating voltage applied to each electrode, ellipsoidal motions in a plurality of motion planes are formed so that the semispherical rotors can be driven in desired directions.

However, since the conventional spherical vibration type actuator shown in FIG. 17 has a plurality of vibrating members, the following disadvantages have been reported to date.

(1) Since a plurality of vibration members are used for a rotation about one axis, it is necessary to make each vibration member have the same characteristics.

(2) Since a plurality of vibration members exist along the circumference of the moving member, it is difficult to make the actuator compact and a space efficiency is poor.

(3) Since the vibration member for another axis not contributing to vibrations is made in pressure contact with the moving member, a resistance to rotation is generated and a problem of efficiency and heat generation occurs.

For the conventional vibration type actuator having a tubular vibration member shown in FIG. 18, the following disadvantages have been reported.

(1) Since alternating signal matching drive directions are required to be applied to a plurality of electrodes formed on the circumferential area of the vibration member, the signal becomes different for each electrode and the control becomes complicated.

(2) Since the semispherical moving members 20a and 20b are made in pressure contact with the cylindrical vibration member 19 by pulling the moving members 20a and 20b toward each other by the spring 21, the movable area is limited and the pressure force is not uniform and is difficult to be adjusted.

SUMMARY OF THE INVENTION

According to one aspect of the present invention, a vibration type actuator is provided which comprises a vibration member formed with vibration generating means for generating vibration displacements at least in three different directions wherein a relative motion in a desired direction is generated between the vibration member and a contact member in contact with the vibration member by supplying the vibration displacements in the three directions to impart synthetic vibrations to the vibration member.

It is an object of the invention to generate a driving force of a multi-degree of freedom by using a single vibration member.

BRIEF DESCRIPTION OF THE DRAWINGS

FIGS. 1A, 1B, 1C and 1D illustrate a first embodiment of the invention, FIG. 1A is a perspective view of a vibration member, FIG. 1B illustrates a primary longitudinal vibration mode, and FIGS. 1C and 1D illustrate a secondary traverse vibration mode.

FIGS. 2A, 2B, 2C and 2D illustrate a second embodiment of the invention, FIG. 2A is a perspective view of a vibration member, FIG. 2B illustrates a primary longitudinal vibration mode, and FIGS. 2C and 2D illustrate a secondary traverse vibration mode.

FIG. 21A is a perspective view of a vibration member showing vibration displacements in different directions, and FIG. 21B is a plan view of piezoelectric elements.

FIG. 22A is a perspective view of a vibration member, FIG. 22B is a diagram illustrating the mount directions of piezoelectric elements, and FIGS. 22C and 22D illustrate displacements of the vibration member.

FIG. 24A is a perspective view of a vibration member, and FIGS. 24B, 24C and 24D illustrate displacements of the vibration member.

FIG. 26A is a cross sectional view taken along line 26A–26A of FIG. 26B, and FIG. 26B is a top view of FIG. 26A.

FIG. 27A is a cross sectional view taken along line 27A—27A of FIG. 27B, FIG. 27B is a top view of FIG. 27A, and FIG. 27C is a side view of FIG. 27A.

Figure 3:
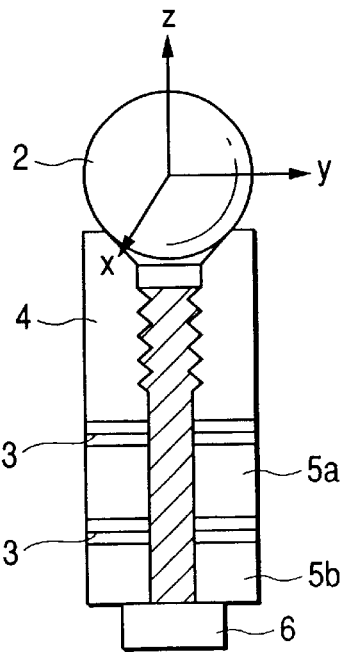
FIG. 3 is a cross sectional view of a vibration type actuator according to a third embodiment of the invention.

DETAILED DESCRIPTION OF THE PREFERRED EMBODIMENTS (First Embodiment)

FIGS. 1A to 1D illustrate the first embodiment of the invention.

FIGS. 1A to 1D illustrate a drive principle of a vibration type actuator of the first embodiment. Between cylindrical elastic members 1 constituting a single vibration member, piezoelectric elements 3 are fixedly sandwiched. The piezoelectric elements 3 function as electrical-mechanical energy conversion elements for providing displacements such as shown in FIGS. 1B to 1D. The piezoelectric elements are, for example, a lamination of a plurality of single-plate piezoelectric elements with necessary electrode plates being interposed. An alternating signal is applied to each electrode plate to drive a corresponding necessary piezoelectric element plate.

In this embodiment, the piezoelectric elements 3 repeat expansion/compression displacements in an axial direction upon application of alternating signals. The piezoelectric elements 3 include first to third piezoelectric elements. The first piezoelectric element excites longitudinal vibrations along a z-axis direction among the x-, y- and z-axis directions intersecting at a right angle, as shown in FIG. 1B. The second piezoelectric element excites traverse (flexural) vibrations in the z-x plane as shown in FIG. 1C. The third piezoelectric element excites traverse (flexural) vibrations in the z-y plane as shown in FIG. 1D. The first piezoelectric element is polarized uniformly along a thickness direction. The second and third piezoelectric elements are polarized to have opposite polarities on diametrical opposite ends along the diametrical thickness direction.

When alternating signals having a phase difference of 90° are applied to the second and third piezoelectric elements, two flexural vibrations of the vibration member are synthesized to form an ellipsoidal motion about the z-axis (in the x-y plane) on the surface of the vibration member. In this case, since the natural frequencies of the vibration member about the x- and y-axes are generally equal, the ellipsoidal vibrations can be generated if alternating signals having the natural frequency as their drive frequencies are applied to the second and third piezoelectric elements.

Next, when an alternating signal having a frequency generally equal to the natural frequency of the vibration member in the z-axis direction is applied to the first piezoelectric element, the vibration member repeats longitudinal vibrations in the primary mode at a predetermined period.

In this case, if the second piezoelectric element is applied with an alternating signal so as to excite the vibration member at the period equal (generally equal) to that of the longitudinal vibrations of the vibration member, then an ellipsoidal motion is generated on a surface point of the vibration member in the x-z plane so that a drive force in the x-axis direction (about y-axis) can be obtained. In this case, the natural frequency of the vibration member in the z-axis direction is different from the natural frequency of the primary flexural vibrations in the x-z plane. Therefore, in this embodiment, as shown in FIG. 1C, the second piezoelectric element is driven in the secondary mode at the natural frequency of flexural vibrations in the x-axis direction to thereby make the period of longitudinal vibrations be coincide with that of flexural vibrations.

Similarly, if the third piezoelectric element is applied with an alternating signal so as to excite the vibration member at the period equal (generally equal) to that of the longitudinal vibrations of the vibration member, then an ellipsoidal motion is generated on a surface point of the vibration member in the y-z plane so that a drive force in the y-axis direction (about x-axis) can be obtained. In this case, the natural frequency of the vibration member in the z-axis direction is different from the natural frequency of the flexural vibrations in the y-z plane. Therefore, in this embodiment, as shown in FIG. 1D, the third piezoelectric element is driven in the secondary mode at the natural frequency of flexural vibrations in the y-axis direction to thereby make the period of longitudinal vibrations be coincide with that of flexural vibrations.

Specifically, by applying alternating signals, e.g., alternating voltages, having a frequency near to the natural frequency of the vibration member 1, to the first to third piezoelectric elements, the vibration member can be excited to have longitudinal or traverse (flexural) vibrations having natural frequencies, such as shown in FIGS. 1B to 1D.

By applying alternating signals to two of the first to third piezoelectric elements, the longitudinal vibrations of the vibration member 1 and two types of traverse (flexural) vibrations intersecting at a right angle are combined to generate ellipsoidal vibrations on a surface point of the vibration member 1. For example, a combination of the mode shown in FIG. 1B and the mode shown in FIG. 1C generates an ellipsoidal motion in the x-z plane, a combination of the mode shown in FIG. 1B and the mode shown in FIG. 1D generates an ellipsoidal motion in the y-z plane, or a combination of the mode shown in FIG. 1C and the mode shown in FIG. 1D generates an ellipsoidal motion in the x-y plane.

Therefore, a moving member made in pressure contact with the vibration member can be driven in a plurality of directions.

With the drive principle for a conventional piezoelectric type actuator, an ellipsoidal motion on a surface point of the elastic element about one-axis is generated by applying alternating signals having a phase difference to the two-phase driving elements of piezoelectric elements constituting the vibration member. In this embodiment, however, a combination of three-phase piezoelectric elements (first to third piezoelectric elements) allows generation of ellipsoidal motions about three axes (in three planes intersecting at a right angle). Therefore, it is possible to realize a vibration type actuator capable of driving a moving member in three planes intersecting at a right angle by a single vibration member, and to make the actuator compact.

(Second Embodiment)

The vibration member of the vibration type actuator of the first embodiment shown in FIGS. 1A to 1D is cylindrical. In the second embodiment, the vibration member is of a rectangular cube. Piezoelectric elements 3 are bonded with adhesive to the sides of an elastic member 1 of a rectangular cube.

In this embodiment, for example, second and third piezoelectric elements for generating traverse (flexural) vibrations are bonded to adjacent two sides of the elastic member 1 of a rectangular solid. Therefore, the second and third piezoelectric elements can be disposed to have a phase difference of 90°. The first piezoelectric element for generating longitudinal vibrations is bonded to one remaining side with adhesive.

Also in this embodiment, alternating signals like those used in the first embodiment are applied to the first to third piezoelectric elements. Upon application of the alternating signal to the first piezoelectric element, the vibration member generates longitudinal vibrations such as shown in FIG. 2B, upon application of the alternating signal to the second piezoelectric element, the vibration member generates flexural vibrations in the x-z plane such as shown in FIG. 2C, and upon application of the alternating signal to the third piezoelectric element, the vibration member generates flexural vibrations in the y-z plane such as shown in FIG. 2D.

Therefore, similar to the first embodiment, combinations of two of three types of vibrations can provide drive forces in three planes intersecting at a right angle.

In this embodiment, since the vibration member can be formed by bonding piezoelectric elements on the sides of a rectangular cube, the vibration member can be formed easily. Moreover, only by bonding two piezoelectric elements for generating flexural vibrations on adjacent sides, the positions (phase difference) of the two piezoelectric elements can be defined.

In the first and second embodiments, if the vibration member is fixed, a contact member (indicated by broken lines in FIGS. 1A and 2B) made in pressure contact with the drive surface of the vibration member and used as a moving member can be supplied with a drive force in perpendicular three-axis directions. Conversely, if the contact member is fixed, the vibration member can be supplied with a drive force relative to the contact member along three-axis directions intersecting at a right angle.

(Third Embodiment)

FIG. 3 illustrates the third embodiment of the invention.

The fundamental structure of a vibration type actuator of the third embodiment is similar to that of the first embodiment shown in FIGS. 1A to 1D. Piezoelectric elements 3 are disposed between a top elastic member 4 having a central hollow portion whose inner surface is formed with a female thread and a middle elastic member 5a having a central hollow portion, and between the middle elastic member 5a and a bottom elastic member 5b. A threading bolt 6 serving as a center shaft member and inserted from the side of the bottom elastic member 5b is engaged with the female thread of the top elastic member 4. Therefore, the piezoelectric elements 3 are fixedly sandwiched between the top elastic member 4 and middle elastic member 5a and between the middle elastic member 5a and bottom elastic member 5b, and these components are integrally coupled together.

In this embodiment, the piezoelectric element 3 disposed between the top elastic member 4 and middle elastic member 5a is a first piezoelectric element for exciting longitudinal vibrations in the vibration member, the piezoelectric elements 3 disposed between the middle elastic member 5a and bottom elastic member 5b are a second piezoelectric element for exciting longitudinal flexural vibrations in the vibration member in the x-z plane and a third piezoelectric element for exciting longitudinal flexural vibrations in the vibration member in the y-z plane. The second and third piezoelectric elements are disposed to have a positional phase difference of 90°.

The upper end portion of the top elastic member 4 has an inner taper surface oblique to the axial direction of the vibration member, the inner taper surface being in contact with a spherical moving member 2.

Therefore, also in this embodiment, similar to the first embodiment, combinations of two vibrations among longitudinal vibrations and flexural vibrations in two directions can make the spherical member 2 rotate about x-, y-, and z-axes.

For example, a combination of the mode shown in FIG. 1C and the mode shown in FIG. 1D can rotate the moving member 2 about the z-axis, a combination of the mode shown in FIG. 1B and the mode shown in FIG. 1C can rotate the moving member 2 about the y-axis, and a combination of the mode shown in FIG. 1B and the mode shown in FIG. 1D can rotate the moving member 2 about the x-axis. The moving member 2 can therefore rotate about three axes intersecting at a right angle.

(Fourth Embodiment)

Figure 4:
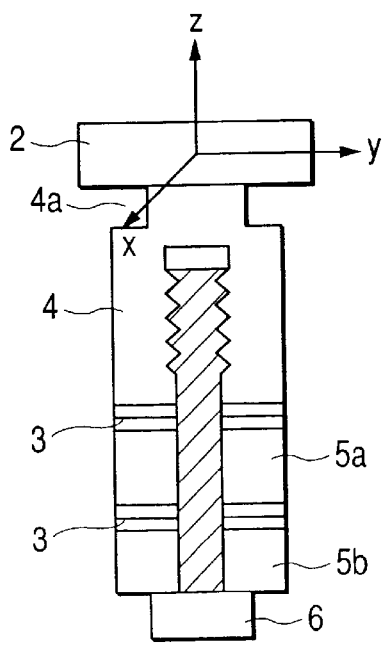
FIG. 4 is a cross sectional view of a vibration type actuator according to a fourth embodiment of the invention.

FIG. 4 illustrates the fourth embodiment of the invention.

The fundamental structure of a vibration type actuator of the fourth embodiment is similar to that of the third embodiment shown in FIG. 3. A different point from the third embodiment is that a moving member 2 on a top portion 4a driven in perpendicular three planes with an ellipsoidal motion has a flat plane shape.

In this embodiment, the moving member 2 made in pressure contact with the top portion of a top elastic member 4 moves in the x- and y-axis directions and about the z-axis. For example, if longitudinal vibrations in the z-axis direction generated by driving the first piezoelectric element and traverse vibrations in the x-z plane generated by driving the second piezoelectric element are excited at a phase difference of about 90°, an ellipsoidal motion is generated in the top portion 4a of the vibration member in the x-z plane and the moving member 2 in contact with the top portion 4a moves linearly in the x-axis direction.

If longitudinal vibrations in the z-axis direction and traverse vibrations in the y-z plane are excited at a phase difference of about 90°, an ellipsoidal motion is generated in the top portion 4a in the y-x plane and the moving member 2 in contact with the top portion 4a moves linearly in the y-axis direction.

In addition, if traverse vibrations in the x-z plane and the y-z plane are excited at a phase difference of about 90°, an ellipsoidal motion is generated in the top portion 4a in the x-y plane and the moving member 2 in contact with the top portion 4a rotates about z-axis.

(Fifth Embodiment)

Figure 5:
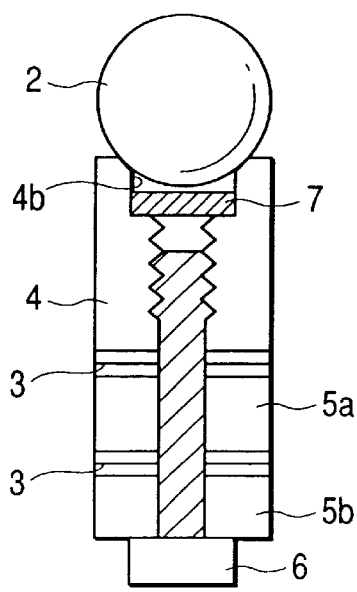
FIG. 5 is a cross sectional view of a vibration type actuator according to a fifth embodiment of the invention.

FIG. 5 illustrates the fifth embodiment of the invention.

In this embodiment, the spherical moving member 2 is attracted toward and pressured against the vibration member of the vibration type actuator of the third embodiment shown in FIG. 3, by a magnetic force of a permanent magnet 7 which is mounted on a top recess portion 4b of the top elastic member 4.

(Sixth Embodiment)

Figure 6:
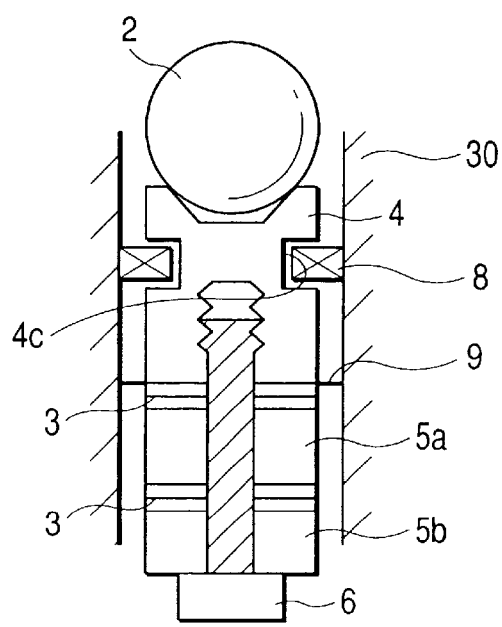
FIG. 6 is a cross sectional view of a vibration type actuator according to a sixth embodiment of the invention.

FIG. 6 illustrates the sixth embodiment of the invention.

In this embodiment, the spherical moving member 2 is attracted toward and pressured against the vibration member of the vibration type actuator of the third embodiment shown in FIG. 3, by a magnetic force of an electromagnet which is energized via a coil 8 disposed in a groove 4c formed in the outer circumferential area of the top elastic member 4. The coil 8 is mounted on a support member 30 disposed around the vibration member. The distal end of a support plate 9 extending from the vibration member is connected to the support member 30.

The coil 8 may be disposed in any area around the vibration member so long as it can constitute a magnetic circuit.

(Seventh Embodiment)

Figure 7:
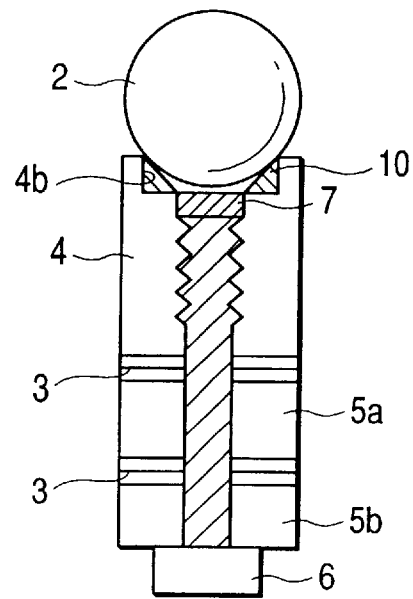
FIG. 7 is a cross sectional view of a vibration type actuator according to a seventh embodiment of the invention.

FIG. 7 illustrates the seventh embodiment of the invention.

This embodiment intends to improve a contact performance of the spherical moving member 2 relative to the vibration member of the vibration type actuator of the third embodiment shown in FIG. 3. A contact area between the moving member 2 and top elastic member 4 is broadened by mounting a contact member 10 made of elastic member on a top recess 4b of the top elastic member 4 near at the contact area.

A contact of the moving member 2 with the vibration member is therefore stabilized so that an output torque increases and an allowable range of component working errors can be broadened.

Similar to the fifth embodiment shown in FIG. 5, in the fifth embodiment, a permanent magnet 7 is mounted on a top recess 4b of the top elastic member 4 and the spherical moving member 2 is attracted toward and pressured against the vibration member by a magnetic force of the permanent magnet 7.

(Eighth Embodiment)

Figure 8:
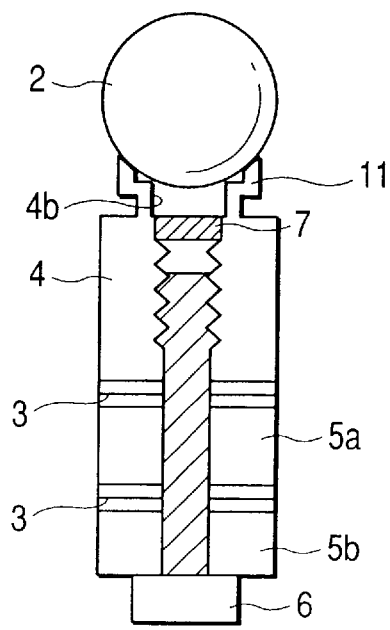
FIG. 8 is a cross sectional view of a vibration type actuator according to an eighth embodiment of the invention.

FIG. 8 illustrates the eighth embodiment of the invention.

This embodiment intends to improve a contact performance of the spherical moving member 2 relative to the vibration member of the vibration type actuator of the third embodiment shown in FIG. 3 similar to the seventh embodiment. A top recess 4b of the top elastic member 4 of the vibration member is formed with an elastic tubular collar 11.

In this embodiment, the moving member 2 is made in contact with the elastic tubular collar 11 at some elastic force by unrepresented pressure means. Therefore, the contact area of the spherical surface of the moving member 2 with the collar 11 can be broadened. A contact of the moving member 2 with the vibration member is therefore stabilized so that an output torque increases and an allowable range of component working errors can be broadened.

Similar to the fifth embodiment shown in FIG. 5, in the eighth embodiment, a permanent magnet 7 is mounted on a top recess 4b of the top elastic member 4 and the spherical moving member 2 is attracted toward and pressured against the vibration member by a magnetic force of the permanent magnet 7.

(Ninth Embodiment)

FIGS. 9, 10, 11A, and 11B illustrate the ninth embodiment of the invention.

This embodiment shows a specific structure of a cylindrical vibration member. Under a top elastic member 4, a first elastic member 5c is directly disposed. Disposed between the first elastic member 5c and second elastic member 5d are piezoelectric element plates 3a and 3b for exciting longitudinal vibrations therein, a piezoelectric element plate 3c for detecting vibrations, a support plate 9 for supporting the vibration member, the central area 9a of which also functions as an electrode plate in contact with the piezoelectric element plate 3a, and electrode plates 12Z, 12SZ, and 13. Disposed between the second elastic member 5d and a third elastic member 5e are piezoelectric element plates 3e, 3f, 3g, and 3h for exciting traverse (flexural) vibrations, piezoelectric element plates 3d and 3i for detecting vibrations, electrode plates 12SA, 12A, 12SB, 12B, and 13, and a sheet 14. By engaging a top thread of a coupling bolt 6 with a female thread formed in the inner surface of a hollow portion of the top elastic member 4, the top elastic member 4, first elastic member 5c, second elastic member 5d, third elastic member 5e, piezoelectric element plates 3a to 3i, electrode plates 12 and 13, and sheet 14 are all integrally sandwiched in a mount state shown in FIG. 10 to constitute the vibration member. The electrode plate 13 is used as a ground electrode.

Figure 11A:
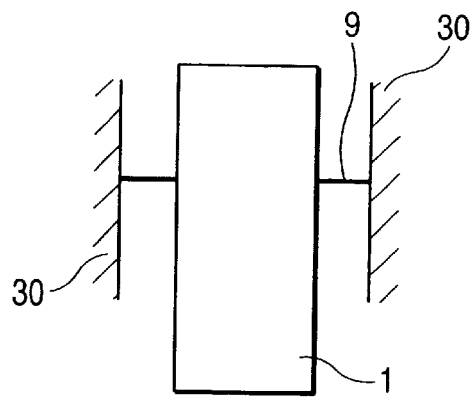
FIGS. 11A and 11B are a side view and a top view showing the vibration member in a supported state shown in FIG. 9.
Figure 11B:
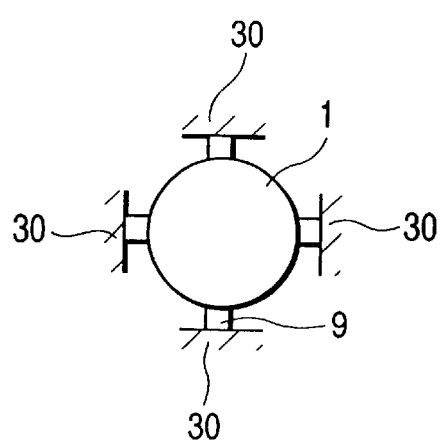

The support plate 9 supports the vibration member by fixing its arm portions radially extending from a central electrode plate area 9a to a fixing member 30 shown in FIGS. 11A and 11B. The support plate 9 may take any shape different from a plate shape so long as the shape does not influence the natural frequency of the vibration member itself. Obviously, the support plate 9 may not function also as the electrode plate.

The piezoelectric element plates 3d, 3e, and 3f and the piezoelectric element plates 3g, 3h, and 3i are polarized to have opposite polarities in left and right sides of each plate, and the plates 3d, 3e, and 3f are disposed in a phase difference of 90° in the flexural direction from that of the plates 3g, 3h, and 3i. The sheets 14 are insulative so as to electrically insulate the second elastic member 5d from the electrode plate 12 or the third elastic member 5e from the electrode plate 12, respectively disposed on opposite sides of the sheets 14.

When an alternating voltage having a frequency near a natural frequency of the vibration member constructed as above is applied from a driver circuit shown in FIG. 19 to be described later, to the electrode plate 12 (12Z) sandwiched between the piezoelectric element plates 3a and 3b, these plates 3a and 3b repeat expansion and contraction in the thickness direction to excite longitudinal vibrations in the vibration member. The piezoelectric element plate 3c has a strain because of the longitudinal vibrations generated by the piezoelectric element plates 3a and 3b and generates an electromotive force. An alternating voltage picked up by the electrode plate 12 (12SZ) connected to the piezoelectric element plate 3c is used for detecting vibrations.

When an alternating voltage having a frequency near a natural frequency of the vibration member is applied to the electrode plate 12 (12A) sandwiched between the piezoelectric element plates 3e and 3f, these plates 3e and 3f repeat expansion and contraction in the diametrical thickness direction to excite traverse vibrations in the vibration member.

The piezoelectric element plate 3d has a strain because of the traverse vibrations of the vibration member excited by the piezoelectric element plates 3e and 3f and generates an electromotive force. An alternating voltage picked up by the electrode plate 12 (12AS) connected to the piezoelectric element plate 3d is used for detecting vibrations. When an alternating voltage having a frequency near a natural frequency of the vibration member is applied to the electrode plate 12 (12B) sandwiched between the piezoelectric element plates 3g and 3h, which are disposed at positions providing a phase difference of 90° relative to the piezoelectric element plates 3d and 3e, both side portions these plates 3g and 3h divided by diameters thereof repeat expansion and contraction in the diametrical thickness direction to excite traverse (flexural) vibrations in the vibration member. The piezoelectric element plate 3i has a strain because of the traverse (flexural) vibrations of the vibration member excited by the piezoelectric element plates 3g and 3h and generates an electromotive force. An alternating voltage picked up by the electrode plate 12 (12SB) connected to the piezoelectric element plate 3i is used for detecting vibrations.

The positions of the piezoelectric element plates 3a to 3c for generating longitudinal vibrations correspond to nodes of the primary longitudinal vibration mode. The positions of the piezoelectric element plates 3d to 3i for generating traverse vibrations correspond to antinodes of the secondary traverse vibration mode.

A neck (recess) 4c formed in the outer circumferential area of the top elastic member 4 increases an amplitude of natural vibrations and can lower the natural frequency. Necks (recesses) 6a formed in the coupling bolt (central shaft) 6 can lower the natural frequency of mainly longitudinal vibrations.

Figure 19:
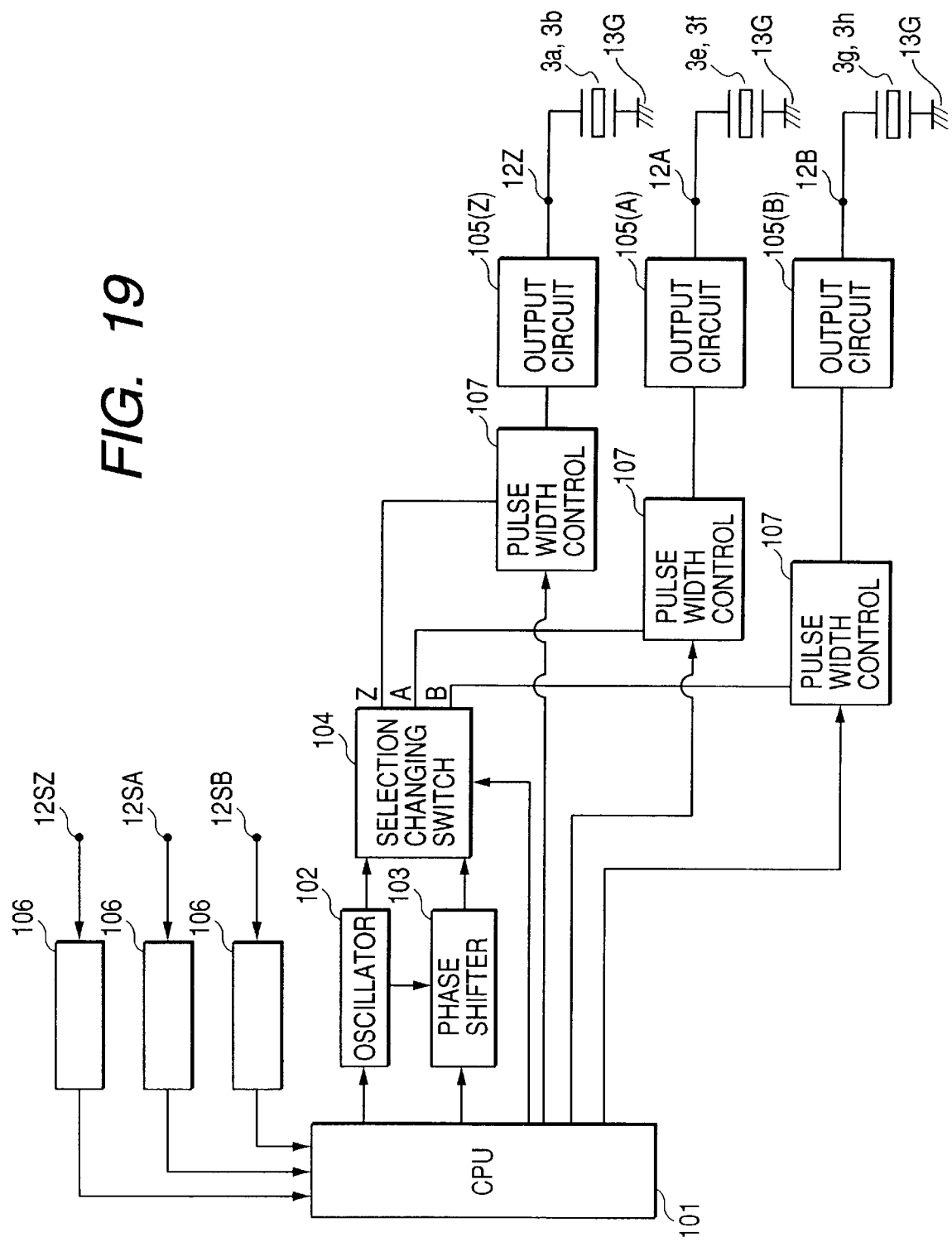
FIG. 19 is a circuit diagram of a driver for driving the vibration type actuator of the ninth embodiment.
Figure 20:
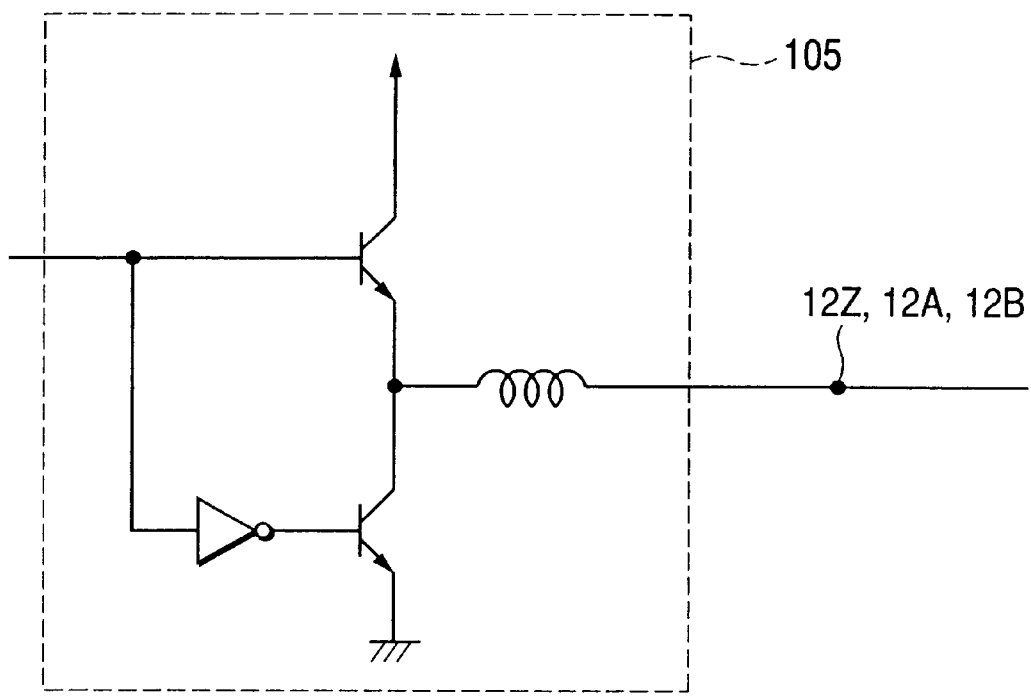
FIG. 20 is a circuit diagram of an output circuit shown in FIG. 19.

FIG. 19 is a block diagram of a driver circuit for driving the vibration member described above. Reference numeral 101 represents a CPU for controlling the whole system, reference numeral 102 represents an oscillator, reference numeral 103 represents a phase shifter, and reference numeral 104 represents a selection switch. Reference numeral 105 represents output circuits for forming drive waveforms, the output circuits 105 each being made of a circuit shown in FIG. 20. Output circuits 105Z, 105A, and 105B are connected to the electrode plates 12Z, 12A, and 12B via which alternating voltages (alternating signals) are applied to the piezoelectric elements 3a and 3b, 3e and 3f, and 3g and 3h, respectively. These piezoelectric elements generate longitudinal vibrations in the z-axis direction, traverse (flexural) vibration in the z-x plane, and traverse (flexural) vibration in the z-y plane.

In accordance with a command from CPU 101, the selection switch 104 selects two of Z, A and B outputs to supply two signals from the oscillator 102 and phase shifter 103. In this manner, rotation about one axis among three axes can be selected.

Reference numeral 107 represents a pulse width controller for controlling a pulse width, the pulse width controller being able to control the amplitude of an alternating voltage to be applied to the piezoelectric element. By independently changing the alternating voltage by changing the pulse width, a vertical/horizontal ratio (a ratio of a long axis to a short axis) of each ellipsoidal locus can be changed.

The size of the ellipsoidal locus can be changed by changing the amplitude of vibrations of the vibration member by setting the oscillation frequency of the oscillator 102 near to or far from the natural frequency of the vibration member.

Amplitude and phase information of the longitudinal vibrations in the z-axis direction, traverse (flexural) vibrations in the z-x and z-y planes and their voltages corresponding to the vibrations, respectively of the piezoelectric element plates 3c, 3d, and 3i, are detected by the electrode plates 12SZ, 12SA, and 12SB and supplied from detection circuits 106 to CPU 101.

In accordance with the supplied information, CPU 101 controls the pulse width controller 107, phase shifter 103, and oscillator 102 to thereby control the ellipsoidal locus to have a desired shape.

The following operations become possible by the above control.

1. Since a speed distribution of the vibration member changes in a motion direction, the speed of the moving member can be changed.
2. Since a friction force distribution changes, it is possible to form an ellipsoidal locus having a minimum friction loss. For example, as to the inclination of the ellipsoidal locus, the axes of the ellipsoidal locus are preferably controlled to perpendicularly intersect with the spherical surface of the moving member. Specifically, it is possible to improve an efficiency by generating the ellipsoidal locus in a radial direction of the inner circumferential surface (oblique to the axial direction) of the elastic member 4 shown in FIG. 3.

Alternatively, it is possible to drive the vibration member in the state of the ellipsoidal locus having a maximum efficiency, by feeding back signals from unrepresented rotation detector and power meter.

3. Since the contact state (displacement and speed in a normal direction) of the moving member and vibration member also changes, the ellipsoidal locus can be formed which provides a contact state with a minimum impact or does not generate abnormal noises such as flutter sounds.

(Tenth Embodiment)

Figure 12:
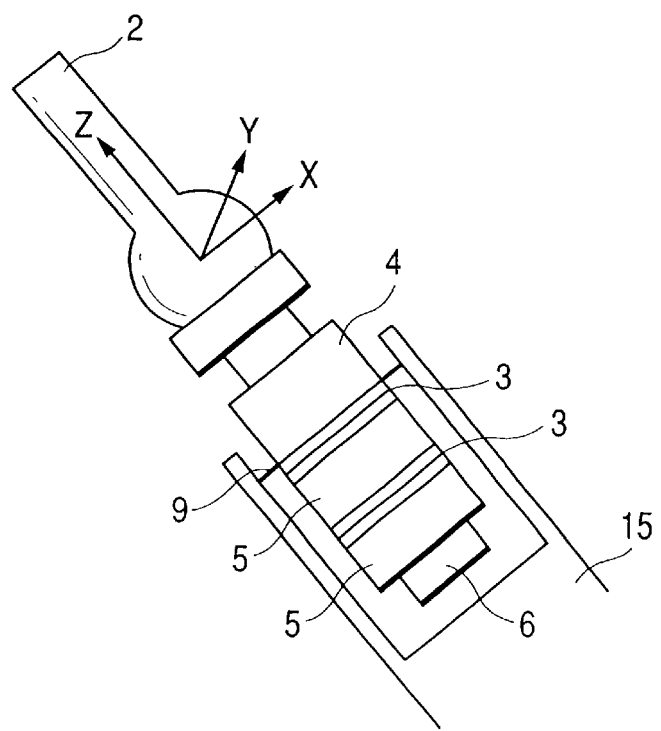
FIG. 12 is a side view illustrating a tenth embodiment of the invention.

FIG. 12 illustrates the tenth embodiment of the invention.

Figure 9:
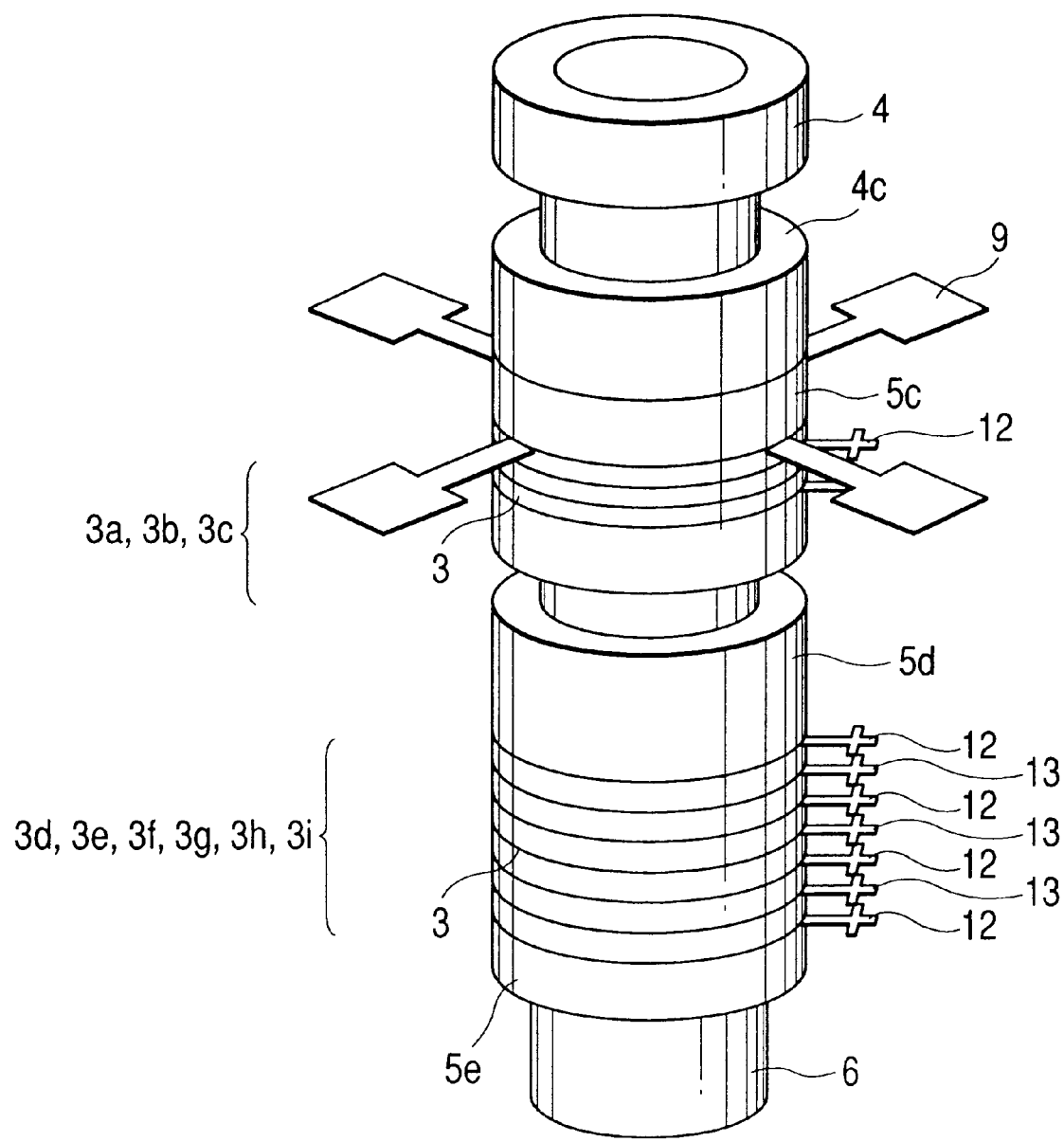
FIG. 9 is a cross sectional view of a vibration type actuator according to a ninth embodiment of the invention.

In this embodiment, for example, the support plate 9 shown in FIG. 9 is supported by a support base 15 capable of moving the vibration member including the support plate 9 in a desired direction. The support base 15 has a tubular shape and is mounted on a robot arm or the like so that a multi-degree of freedom vibration type actuator can be applied to an articulation capable of performing a motion of a multi-degree of freedom.

(Eleventh Embodiment)

Figure 13:
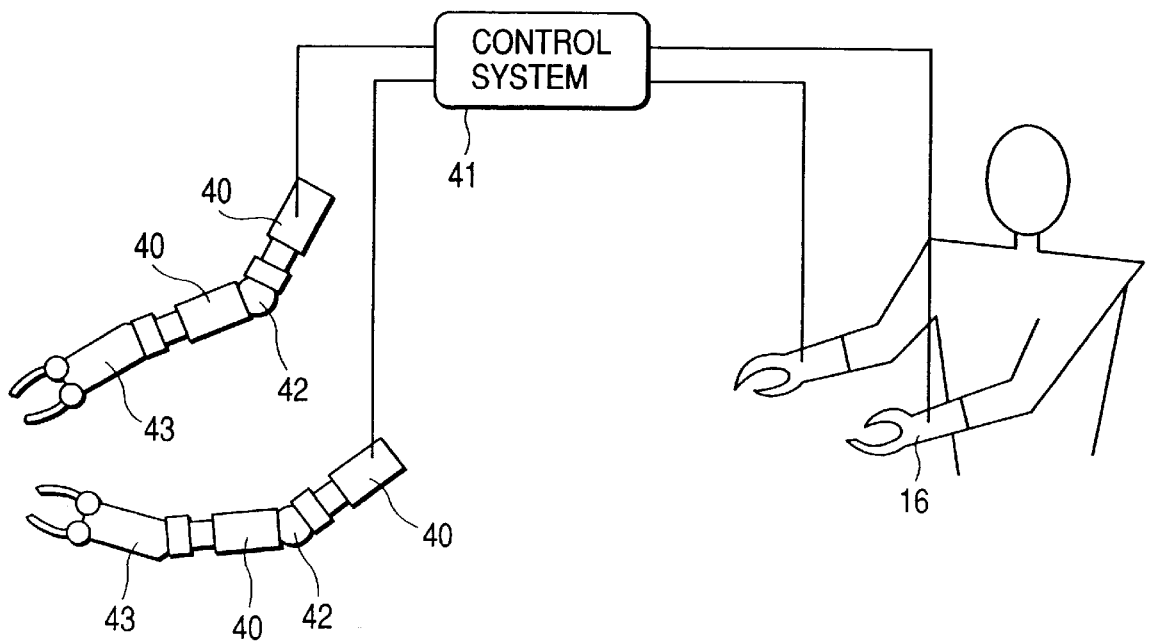
FIG. 13 is a side view illustrating an eleventh embodiment of the invention.

FIG. 13 illustrates the eleventh embodiment of the invention.

In this embodiment, two serially connected vibration type actuators 40 similar to ones of the above embodiments and embodiments shown in FIGS. 21A and 21B through 27A to 27C to be described later are used as each of right and left operation arms. The operation arms are remotely controlled by a control system 41 by using operation gloves. A remote operation system for driving actuators through a combination of the control system 41 and the operation arms 16 capable of reading angle changes of a human articulation, is already known. Therefore, the description of the structure of these components is omitted.

The operation arm of this embodiment is structured as in the following. A moving member 42 of the vibration type actuator 40 on the proximal end side has a spherical shape and is mounted on the bottom end of the vibration type actuator 40 on the distal end side. A moving member 43 of the vibration type actuator 40 on the distal end side has a rod shape having an operation finger portion (the moving member 43 has a spherical surface at the contact area of the top elastic member of the vibration member). The moving members 42 and 43 are mounted on the operation arm at positions corresponding to human articulations. In this manner, a remote operation machine (robot) realizing human motions can be realized. A remote operation machine is a machine capable of moving like human motions.

Such a remote operation machine may be used for laparoscopic surgery or microsurgery. A laparoscopic surgery is a surgery using an endoscope inserted in a human body and tweezers, without opening a patient body.

This application of the embodiment realizes a complicated motion of human hands in the inside of a patient abdomen without entering human hands therein. Therefore, surgery more precise than a conventional laparoscopic surgery becomes possible. A microsurgery is a surgery with fine operations to be performed for fine biotissues. Presently, the microsurgery is performed directly with human hands by using a microscope. By changing a patient side scale and a machine side scale by using the remote operation machine, fine operations difficult to be performed with human hands can be achieved.

(Twelfth Embodiment)

Figure 14:
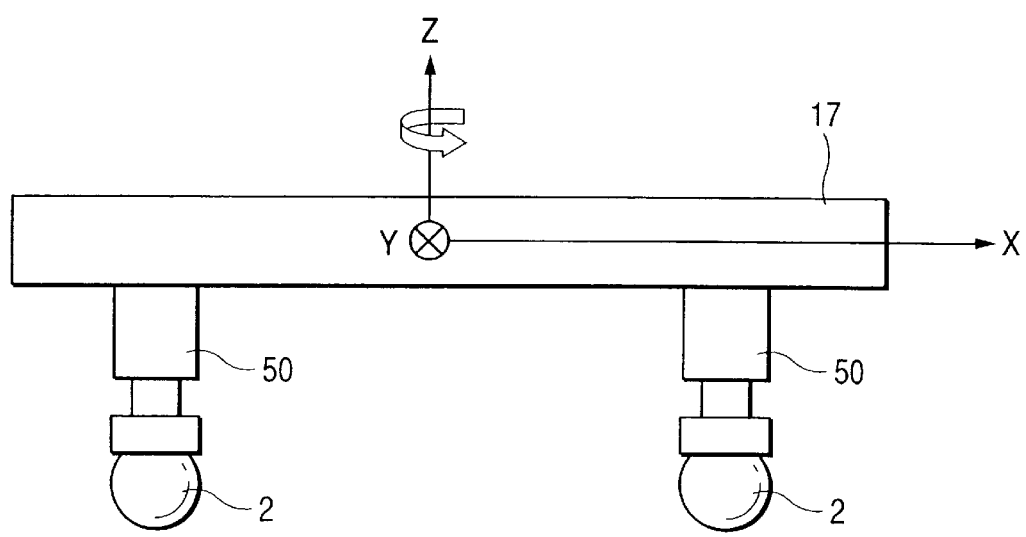
FIG. 14 is a perspective view illustrating a twelfth embodiment of the invention.

FIG. 14 illustrates the twelfth embodiment of the invention.

In this embodiment, a plurality of vibration type actuators (vibration type actuators of a multi-degree of freedom) 50 similar to ones of the above embodiments and embodiments shown in FIGS. 21A and 21B through 27A to 27C to be described later, are mounted on a chassis 17 and the spherical moving members are used. In this manner, the chassis 17 can be moved in the x-y plane in a desired way including translation and rotation. In the example shown in FIG. 14, although the moving members 2 of the vibration type actuators 50 of a multi-degree of freedom are in contact with an unrepresented floor, they may be made in contact with the lower surface of rails mounted at a high position to realize a suspension type motion mechanism.

(Thirteenth Embodiment)

Figure 15:
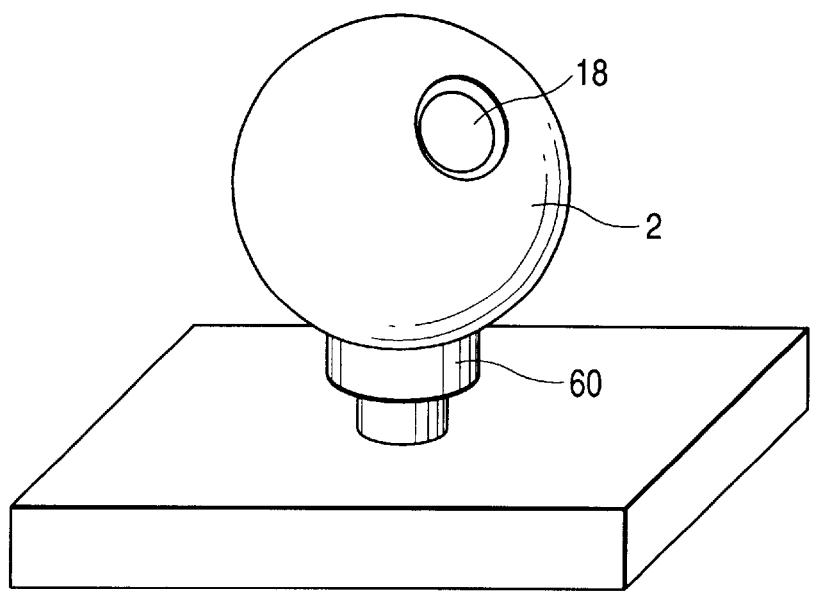
FIG. 15 is a side view illustrating a thirteenth embodiment of the invention.
Figure 16:
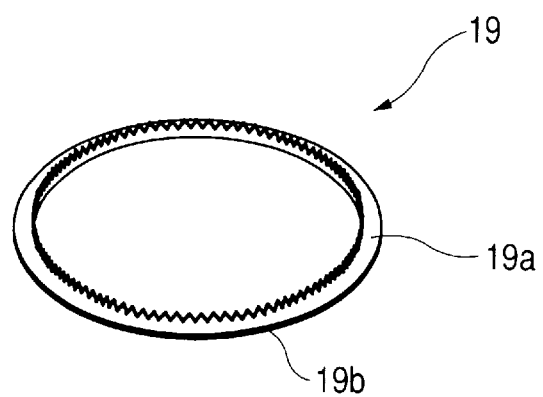
FIG. 16 is a perspective view of a ring shape vibration member.
Figure 17:
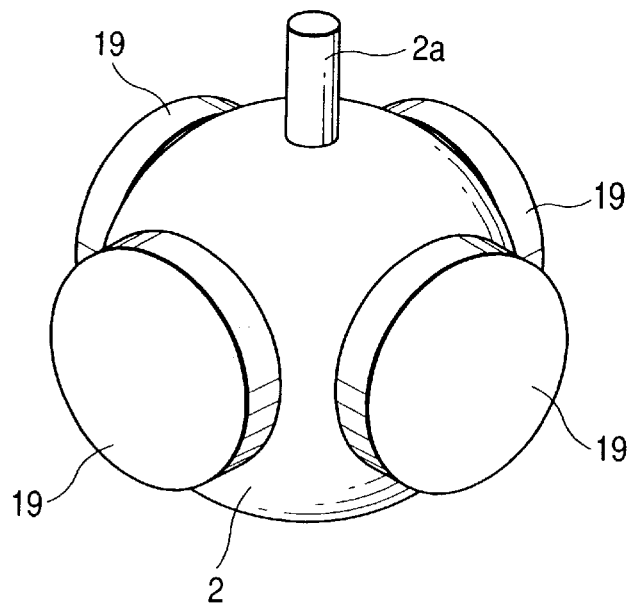
FIG. 17 is a perspective view of a conventional spherical vibration type actuator.
Figure 18:
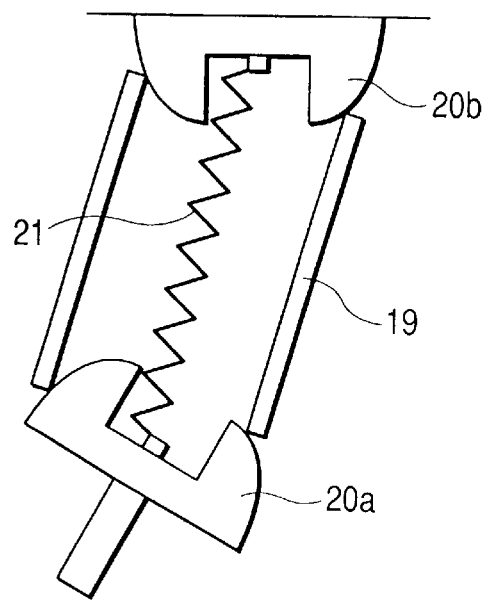
FIG. 18 is a cross sectional view of a conventional vibration type actuator.

FIG. 15 illustrates the thirteenth embodiment of the invention.

In this embodiment, a camera 18 is mounted in a spherical moving member 2 of the moving member of a vibration type actuator (vibration type actuator of a multi-degree of freedom) 50 similar to one of the above embodiments and embodiments shown in FIGS. 21A and 21B through 27A to 27C to be described later, to thereby realize an image pickup device for entering image information to a monitor camera, a computer or the like.

(Fourteenth Embodiment)

Figure 21A:
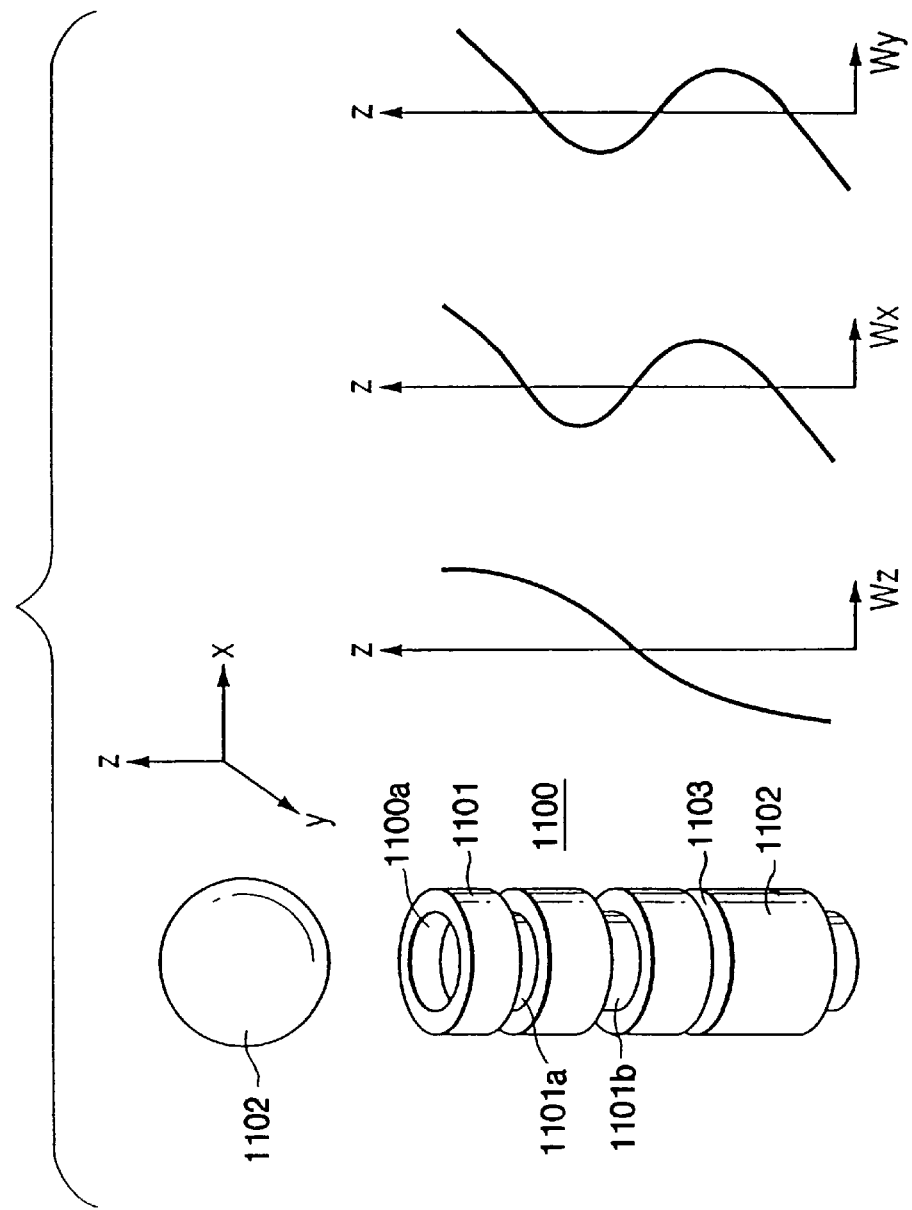
FIGS. 21A and 21B illustrate a fourteenth embodiment.
Figure 21B:
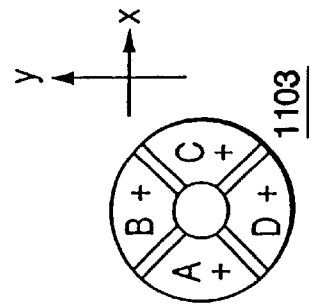

FIGS. 21A and 21B illustrate the fourteenth embodiment of a vibration type actuator and its drive principle. Between cylindrical elastic members 101 and 102 constituting a single vibration member 100, a piezoelectric element 103 divided into four polarized areas such as shown in FIG. 21B and functioning as electrical-mechanical energy conversion elements is fixedly sandwiched (the piezoelectric element 103 being a lamination of a plurality of piezoelectric element plates each divided into four polarized areas having the same phase). Alternating signals (voltages) for independently driving each polarized area of the piezoelectric element 103 can be applied. An inner circumferential surface 100a of the vibration member constituting a contact area (drive area) to a moving member 102 is set oblique to the axial direction of the vibration member, and the spherical moving member 102 is slightly entered into the inside of the vibration member 100.

The polarized areas A to D of the piezoelectric element 103 have the same polarity. In order to displace the vibration member 100 in the z-axis direction, the following alternating signals are supplied:

$$V_A = V_B V_C = V_D = \sin \omega t$$

$$V_A = V_C = \sin \omega t \text{ or } V_B = V_D = \sin \omega t$$

In order to displace the vibration member 100 in the x-axis direction (flexural vibrations in the z-x plane), the following alternating signals are applied:

$$V_A = \sin \omega t, V_C = -\sin \omega t, \text{ or}$$

$$V_A = \cos \omega t, V_C = -\cos \omega t$$

In order to displace the vibration member 100 in the y-axis direction (flexural vibrations in the z-y plane), the following alternating signals are applied:

$$V_B = \sin \omega t, V_D = -\sin \omega t, \text{ or}$$

$$V_B = \cos \omega t, V_D = -\cos \omega t$$

Upon application of these alternating signals, the vibration member 100 is displaced in the z-, x-, and y-axis directions as shown in FIG. 21A. Vibrations in respective axes are resonated by setting the primary mode to the vibrations in the z-axis direction and the secondary mode to the vibrations in the x- and y-axis directions.

A first portion 101a having a small rigidity because of a circumferential groove corresponds to the node of vibrations in the x- and y-axis directions and servers to enhance the displacement of flexural (bending) vibrations.

A second portion 101b having a small rigidity because of a circumferential groove corresponds to the node of vibrations in the z-axis direction and servers to enhance the displacement of longitudinal vibrations.

The embodiment shown in FIGS. 21A and 21B does not require an electrical-mechanical energy conversion element dedicated to longitudinal vibrations like those first to thirteenth embodiments. The displacement of the vibration member 100 in the three-axis directions is allowed fundamentally by selectively supplying alternating signals to a plurality of polarized areas.

Next, supplying alternating signals to rotate the spherical moving member 102 about each axis will be described.

In order to rotate the moving member 102 about the x-axis, displacements in the z- and y-axis directions are imparted, for example, at a phase difference of 90°. Namely, the following alternating signals are supplied to corresponding polarized areas A to D:

$V_A=V_B=V_C=V_D=\sin \omega t$ (displacement in the z-axis direction)

$V_B=\cos \omega t$, $V=-\cos \omega t$ (displacement in the y-axis direction)

Therefore, the following alternating signals are supplied to the polarized areas A to D:

$V_A=\sin \omega t$ $V_B=\sin \omega t+\cos \omega t=\sqrt{2} \sin(\omega t+\pi/4)$ $V_C=\sin \omega t$ $V_D=\sin \omega t-\cos \omega t=\sqrt{2} \sin(\omega t-\pi/4)$ In order to rotate the moving member 102 about the y-axis, displacements in the z- and x-axis directions are imparted, for example, at a phase difference of 90°. Namely, the following alternating signals are supplied to corresponding polarized areas A to D:

$V_A=V_B=V_C=V_D=\sin \omega t$ (displacement in the z-axis direction)

$V_A=\sin \omega t$, $V_C=\sin \omega t$ (displacement in the x-axis direction)

Therefore, the following alternating signals (z-axis direction displacement+x-axis direction displacement) are supplied to the polarized areas A to D:

$V_A=\sqrt{2} \sin(\omega t+\pi/4)$ $V_B=\sin \omega t$ $V_C=\sqrt{2} \sin(\omega t-\pi/4)$ $V_D=\sin \omega t$ In order to rotate the moving member 102 about the z-axis, displacements in the x- and y-axis directions are imparted, for example, at a phase difference of 90°. Namely, the following alternating signals (x-axis direction displacement+y-axis direction displacement) are supplied to corresponding polarized areas A to D:

$V_A=\sin \omega t$ $V_B=\cos \omega t$ $V_C=-\sin \omega t$ $V_D=-\cos \omega t$ In imparting the displacement in the z-axis direction, if only the polarized areas A and C of the piezoelectric element 103 are used, the alternating signal to each polarized area is changed as in the followings.

Namely, for the rotation about the x-axis, the following alternating signals are supplied:

$V_A=V_C=\sin \omega t$ $V_B=\cos \omega t$ $V_D=-\cos \omega t$

For the rotation about the y-axis, the following alternating signals are supplied:

$V_A=\cos \omega t$ $V_B=\sin \omega t$ $V_C=-\cos \omega t$ $V_D=\sin \omega t$ For the rotation about the z-axis, the following alternating signals are supplied:

$V_A=\sin \omega t$ $V_B=\cos \omega t$ $V_C=-\sin \omega t$ $V_D=-\cos \omega t$ If the phase difference is changed from 90°, the shape of the ellipsoidal motion changes so that the vibration member can be driven with a high torque matching a contact angle between the moving member 102 and the driving area of the vibration member 100.

(Fifteenth Embodiment)

FIGS. 22A to 22D illustrate the structure and displacement modes of a vibration type actuator according to the fifteenth embodiment.

In this embodiment, a cylindrical elastic member 201 and a disk type elastic member 202 coupled together constitute a single vibration member 200. The elastic member 201 is in reality divided into two pieces between which piezoelectric elements 203 and 204 as electrical-mechanical energy conversion elements are fixedly sandwiched. The disk type elastic member 202 has four piezoelectric elements 205a to 205d as electrical-mechanical energy conversion elements mounted on the surface of the elastic member 202.

Figure 10:
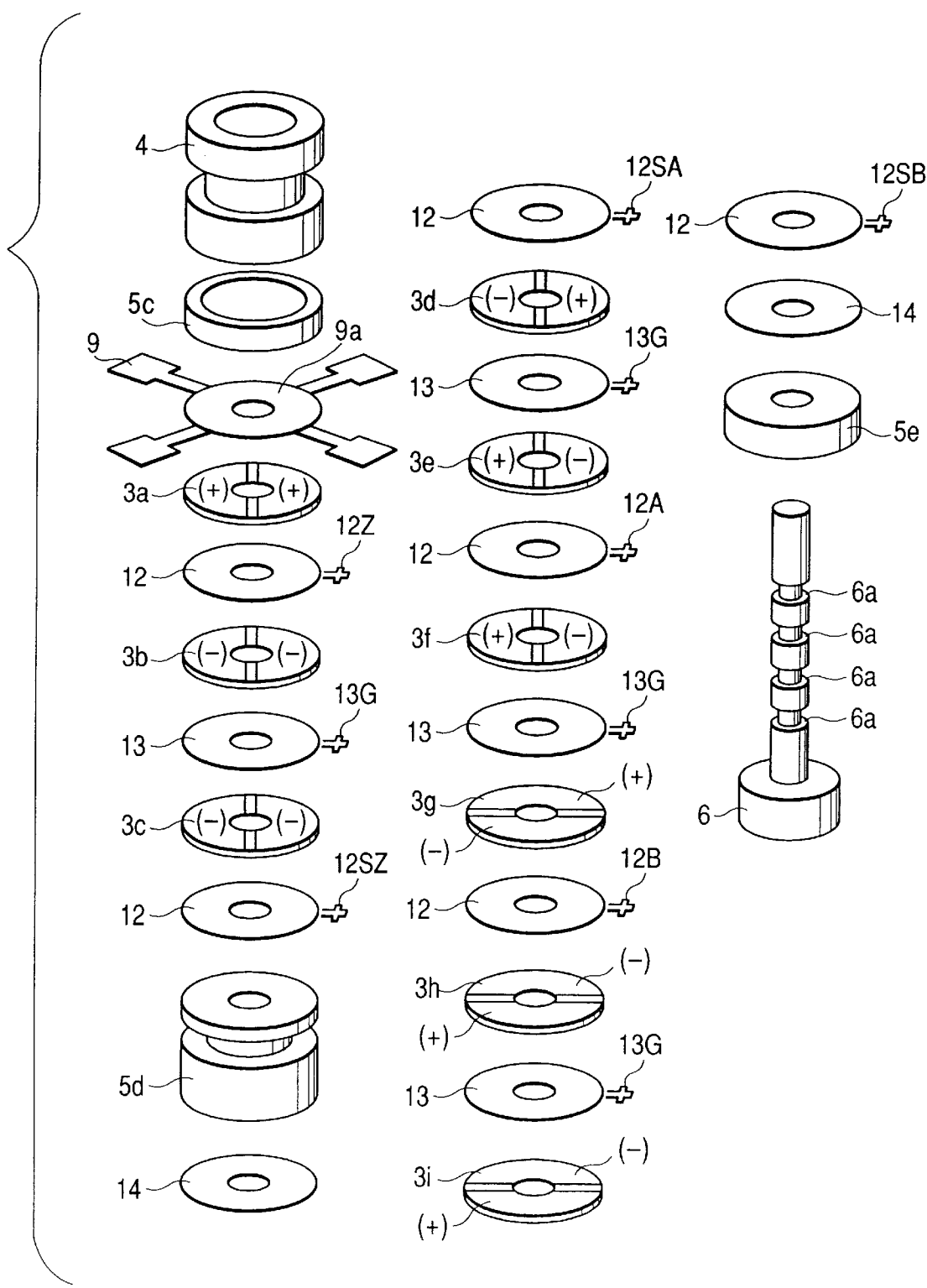
FIG. 10 is a broken perspective view of a vibration member shown in FIG. 9.
Figure 22A:
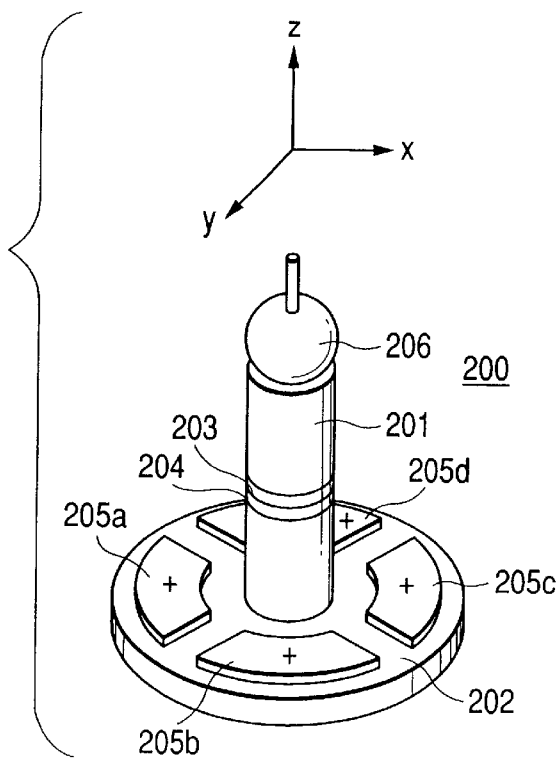
FIGS. 22A, 22B, 22C and 22D illustrate a fifteenth embodiment.
Figure 22B:
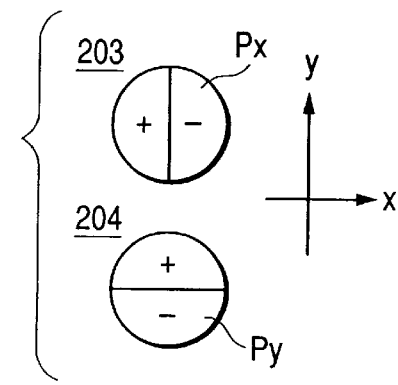
Figure 22C:
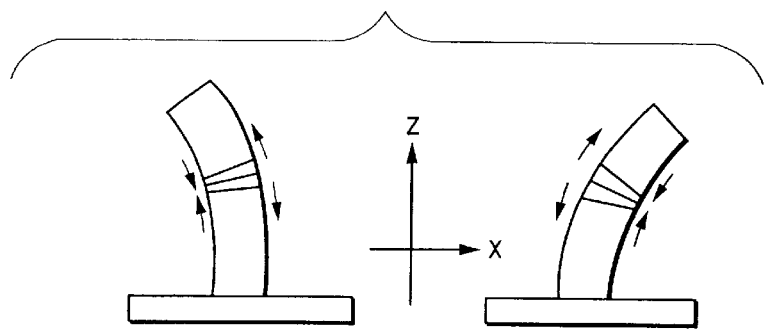

The piezoelectric element 203 displaces the elastic member 201 serving as the driving part in the x-direction as shown in FIG. 22C, and provides the same function as that of the piezoelectric elements 3e and 3f shown in FIG. 10. The piezoelectric element 204 displaces the elastic member 201 serving as the driving part in the y-direction, and provides the same function as that of the piezoelectric elements 3g and 3h shown in FIG. 10. The piezoelectric elements 203 and 204 have polarization phases shifted by 90°.

Figure 22D:
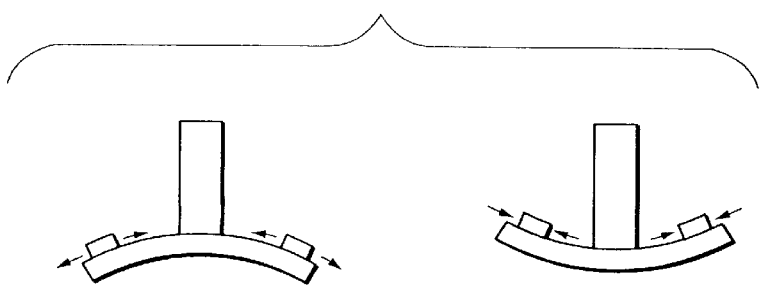

The piezoelectric elements 205a to 205d all have the same polarization polarity and bend the disk type elastic member 202 as shown in FIG. 22D to thereby displace the elastic member 201 serving as the driving part in the z-axis direction.

A spherical moving member 206 similar to the fourteenth embodiment abuts on the elastic member 201 serving as the driving part. By supplying alternating signals having a phase shift of, for example, 90° to the piezoelectric elements 204, 205a to 205d, the moving member 206 can be rotated about the x-axis. By supplying alternating signals having a phase shift of, for example, 90° to the piezoelectric elements 203, 205a to 205d, the moving member 206 can be rotated about the y-axis.

In order to rotate the moving member 206 about the z-axis, alternating signals having a phase shift of, for example, 90° are supplied to the piezoelectric elements 203 and 204.

Figure 23:
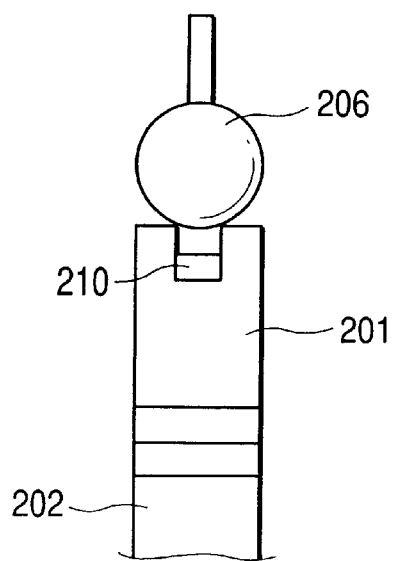
FIG. 23 is a diagram showing suction holding means for holding the vibration member and contact member shown in FIGS. 22A, 22B, 22C and 22D.

In order to make the moving member 206 always in pressure contact with the elastic member 201 irrespective of the direction of a gravitational force of the moving member 206, a permanent magnet 210 may be mounted in the elastic member 201 as shown in FIG. 23 and the moving member 206 itself is made of magnetic material. With these methods, the moving member 201 can be made always in pressure contact with the vibration 200 because of an attraction force of the permanent magnet, irrespective of the direction of a gravitational force.

The shape of the ellipsoidal motion may be changed with some advantageous results by setting the phase shift different from 90°.

(Sixteenth Embodiment)

FIGS. 24A to 24D illustrate the structure and displacement modes of a vibration type actuator according to the sixteenth embodiment.

In this embodiment, a cylindrical elastic member 301 and a disk type elastic member 302 coupled together constitute a single vibration member 300. A permanent magnet (not shown) is mounted in the elastic member 301 to make a moving member 306 made of magnetic material always in pressure contact with the vibration member 300 by the attraction force of the permanent magnet.

The elastic member 302 has four piezoelectric elements (polarized areas) 303a to 303d as electrical-mechanical energy conversion elements mounted on the surface of the elastic member 302. By selectively supplying alternating signals to the piezoelectric elements 303a to 303d, the elastic member 301 serving as the driving part can be displaced in the x-, y-, and z-axis directions as shown in FIGS. 24B to 24D.

In order to rotate the moving member 306 about the x-axis, displacement (FIG. 24C) in the y-axis direction and displacement (FIG. 24D) in the z-axis direction having a phase difference of, for example, 90° are imparted. In order to rotate the moving member 306 about the y-axis, displacement (FIG. 24B) in the x-axis direction and displacement (FIG. 24D) in the z-axis direction having a phase difference of, for example, 90° are imparted. In order to rotate the moving member 306 about the z-axis, displacement (FIG. 24B) in the x-axis direction and displacement (FIG. 24C) in the y-axis direction having a phase difference of, for example, 90° are imparted. The shape of the ellipsoidal motion may be changed with some advantageous results by setting the phase shift different from 90°.

Supplying the alternating signals to the piezoelectric elements 303a to 303d is similar to the fourteenth embodiment and the detailed description thereof is omitted.

(Seventeenth Embodiment)

Figure 25:
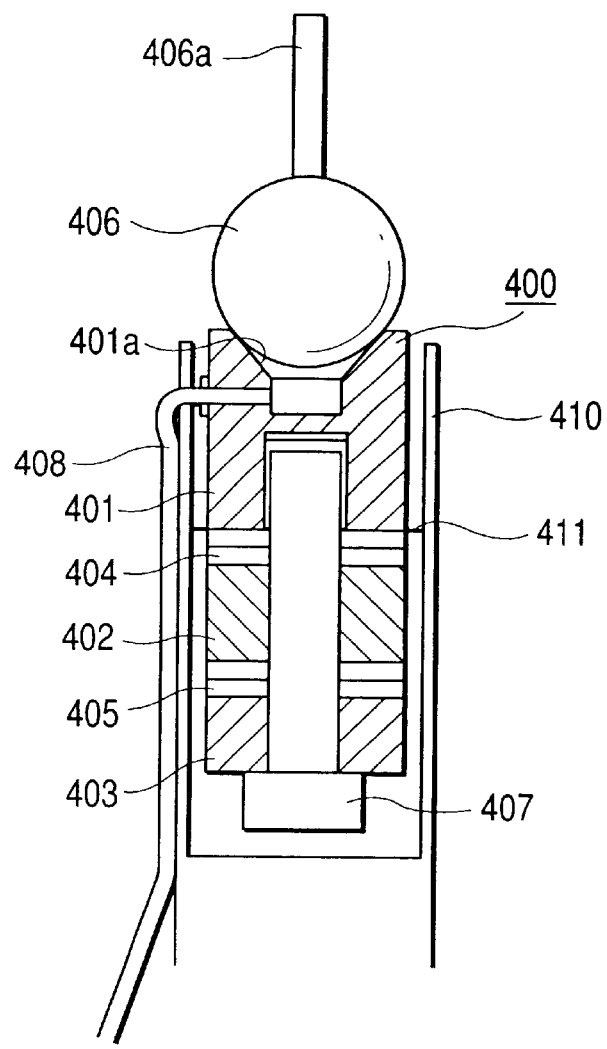
FIG. 25 is an elevational cross sectional view of a vibration type actuator according to a seventeenth embodiment.

FIG. 25 illustrates the structure of a vibration type actuator according to the seventeenth embodiment.

In this embodiment, a plurality of cylindrical elastic members 401, 402, and 403 constitute a single vibration member 400. Between the elastic members 401 and 402, a piezoelectric element 404 is sandwiched, and between the elastic members 402 and 403, a piezoelectric element 405 is sandwiched. These three elastic members 401 to 403 are coupled together by a bolt 407 which serves as a coupling means. Reference numeral 406 represents a spherical moving member.

The feature of this embodiment resides in that pressure contact between the vibration member 400 and moving member 406 is ensured by air suction. Specifically, a hose 408 is inserted into a recess 401a near the driving part of the vibration member 400, and air in the recess is sucked via the hose 408 to generate an attraction force near the driving part. It is therefore possible to make the moving member always in pressure contact with the vibration member 400, irrespective of the direction of a gravitational force.

Reference numeral 410 represents a casing. The distal ends of a support member 411 sandwiched between the elastic members 401 and 402 are fixed to the casing 410 to thereby support the vibration member 400.

(Eighteenth Embodiment)

Figure 26A:
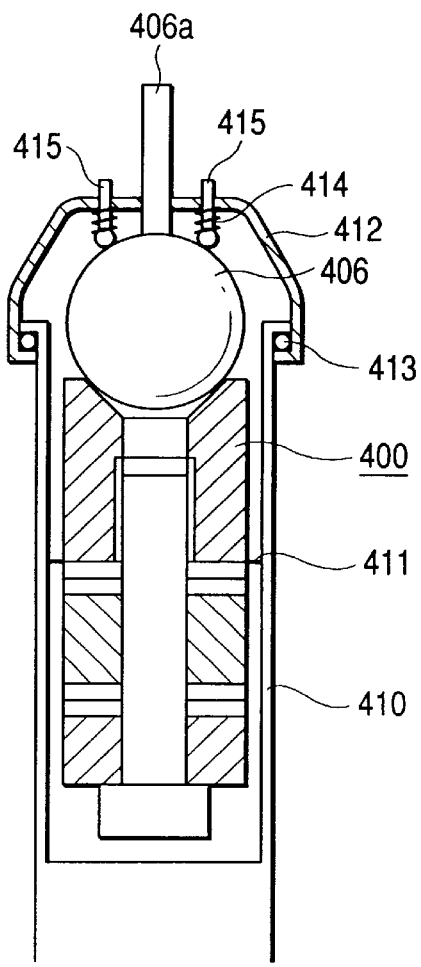
FIGS. 26A and 26B show a vibration type actuator according to an eighteenth embodiment of the invention.

The eighteenth embodiment is a modification of the seventeenth embodiment and has, as shown in FIG. 26A, a different structure for making a moving member 406 in pressure contact with a driving part of a vibration member 400.

Specifically, an upper dome cover 412 is rotatively mounted on a casing 410 at its upper portion by a ball bearing 413. Four pushers 415 are movably mounted on the upper cover 412, the pusher 415 pushing the moving member 406 toward the vibration member 400 by a coil spring 414. This pushing force by the pusher 415 makes the moving member 406 in pressure contact with the vibration member 400 irrespective of the direction of a gravitational force. The vibration member 400 is supported by the casing 410 by a support member 411.

Figure 26B:
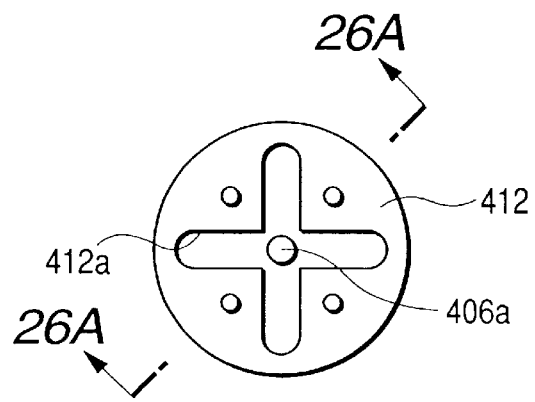

A projection 406a serving as an actual driving part of the moving member 406 extends above the upper cover 412. In order to allow the moving member 406 to rotate in any direction, the upper cover 406 is formed with a cross notch 412a as shown in FIG. 26B.

The projection 406a of the moving member 406 is inserted into the notch 412a and the upper case 412 is freely rotative relative to the casing 410. Therefore, even if the projection 406a is rotated (swung) in any direction, the upper cover 412 is also rotated to make the projection 406a enter into the notch 412a without any restriction.

(Nineteenth Embodiment)

Figure 27A:
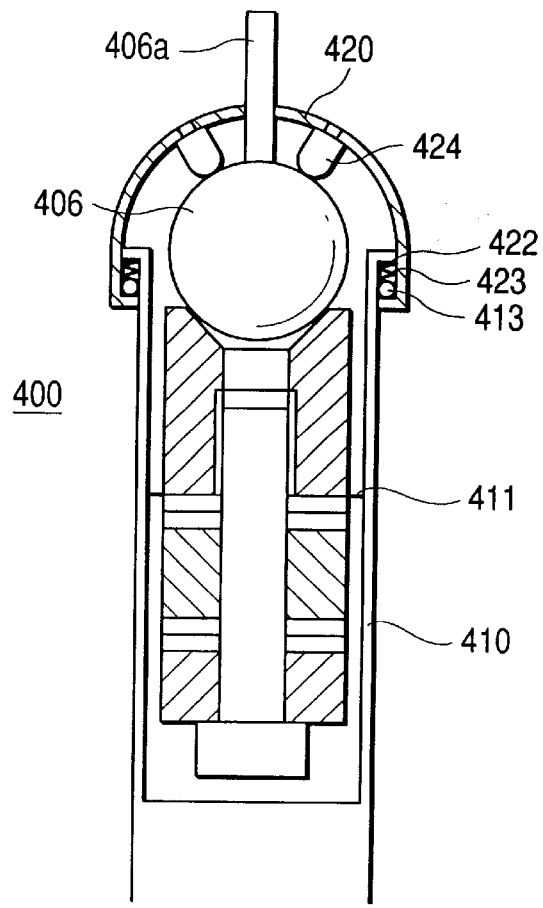
FIGS. 27A, 27B and 27C show a vibration type actuator according to a nineteenth embodiment of the invention.

The nineteenth embodiment is a modification of the eighteenth embodiment and, as shown in FIG. 27A, an upper cover 420 is rotatively mounted on a casing 410 at its upper portion by a ball bearing 413 on which belleville springs 422 are mounted with a ball bearing pusher 423 being interposed under the belleville springs 422. The belleville springs 422 push the upper cover 420 downward toward the casing 410 to energize the moving member 406 and vibration member 400 in a pressure contact direction.

Three fixed pushers 424 formed on the inner surface of the upper cover 420 make the moving member 406 in pressure contact with the vibration member.

Figure 27C:
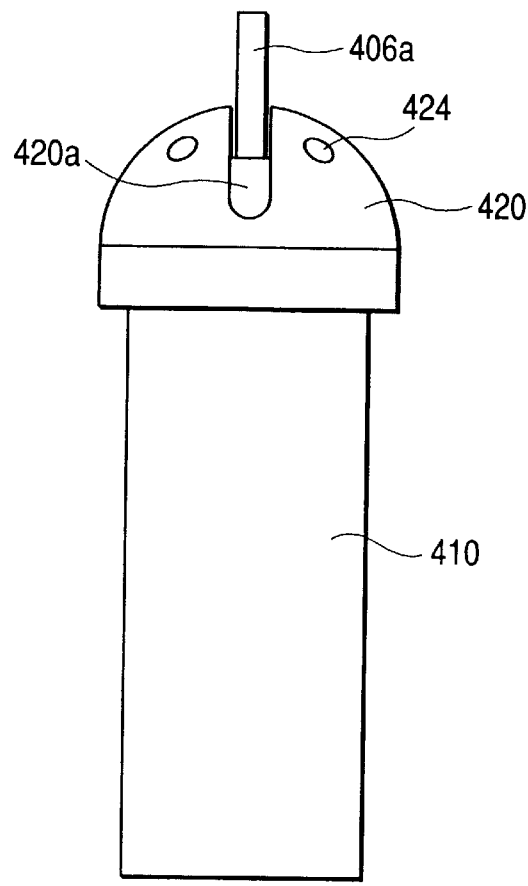
Figure 27B:
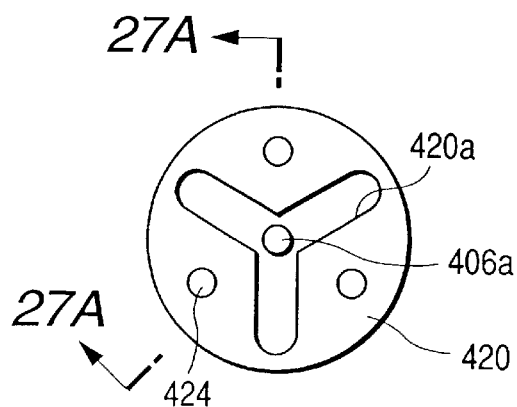

As shown in FIG. 27B, the upper cover 420 has a generally Y-character shaped notch 420a. The function of this notch 420a is the same as the notch 412a shown in FIG. 26B. FIG. 27C shows an outer shape of the vibration type actuator.

In the embodiments having the upper covers 412 and 420 shown in FIGS. 26A and 26B through 27A to 27C, the moving member 406 is substantially covered with the upper cover so that it is possible to prevent a change in a friction coefficient to be caused by oil or dusts when it is touched.

(Twentieth Embodiment)

Figure 29:
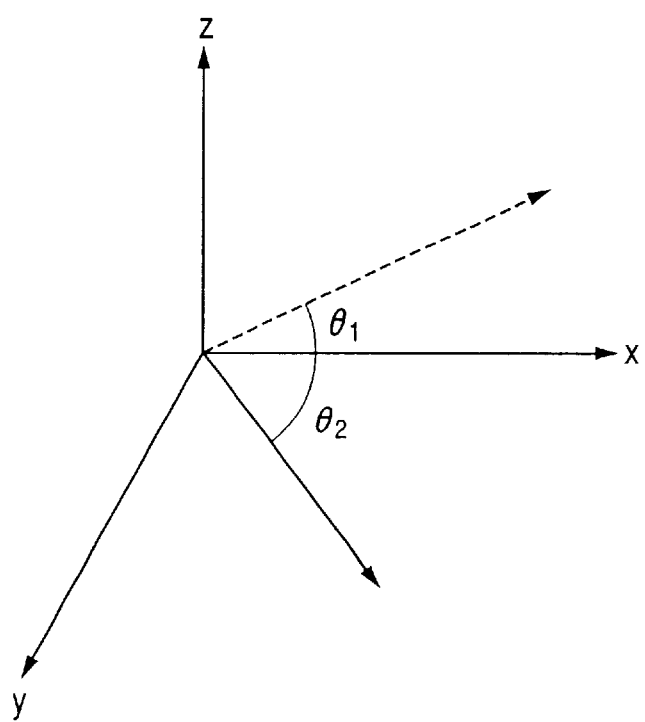
FIG. 29 is a vector diagram illustrating a principle of the twentieth embodiment.

In this embodiment, the moving member can rotate at any desired angle. A broken line shown in FIG. 29 is an axis slanted by an angle $\theta_1$ from the x-axis to the z-axis in the x-z plane, and a solid line in FIG. 29 is an axis slanted by an angle $\theta_2$ from the x-axis to the y-axis in the x-y plane.

If rotations about an axis slanted by an angle of $\theta_1$ or $\theta_2$ from two of the x-, y-, and z- reference axes can be realized, a rotation about any axis in an optional direction can also be realized.

As a specific example, a method of realizing rotations about the axis slanted by an angle of $\theta_1$ and $\theta_2$ from the x-axis will be described.

Figure 28:
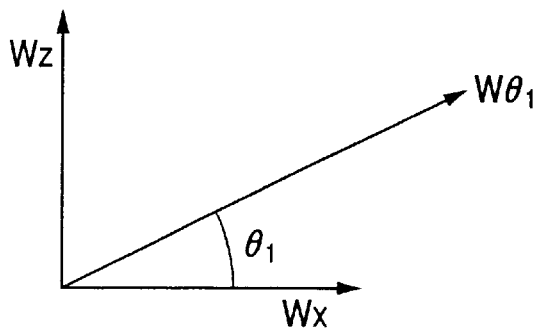
FIG. 28 is a vector diagram illustrating a principle of a twentieth embodiment of the invention.

As shown in FIG. 28, a rotation about the axis slanted by an angle $\theta_1$ from the x-axis in the x-z plane can be defined by:

$$\omega\theta_1 = A\omega x + B\omega z$$

where $B/A = \tan \theta_1$ and $|\omega x| = |\omega z|I$

As shown in FIG. 29, a rotation about the axis slanted by an angle $\theta_2$ from the x-axis in the x-y plane can be defined by:

$$\omega\theta_2 = C\omega x + D\omega y$$

where $D/C = \tan \theta_2$ and $|\omega x| = |\omega y|$

A rotation about the axis slanted by an angle of $(\theta_1+\theta_2)$ can be defined by:

$$\omega(\theta_1+\theta_2) = \omega\theta_1 + \omega\theta_2 = A\omega x + B\omega y + C\omega z$$

where $B/A = \tan \theta_2$ and $C/A = \tan \theta_1$

In the following description, the phase difference is first assumed to be 90°.

The vibration type actuator shown in FIGS. 1A to 1D, 2A to 2D and 3 to 10 is used, and the alternating signals to be supplied to the electrode plates 12A, 12B, and 12Z shown in FIG. 10 for allowing the vibration member to be driven about an axis having a desired angle will be described.

A rotation $\omega x$ about the x-axis can be realized by the following alternating signals:

$$V_{12Z} = \sin \omega t \ (Z \text{ direction})$$

$$V_{12B} = \cos \omega t \ (Y \text{ direction})$$

A rotation $\omega y$ about the y-axis can be realized by the following alternating signals:

$$V_{12Z} = \sin \omega t \ (Z \text{ direction})$$

$$V_{12A} = \cos \omega t \ (X \text{ direction})$$

A rotation $\omega z$ about the z-axis can be realized by the following alternating signals:

$$V_{12A} = \sin \omega t \ (X \text{ direction})$$

$$V_{12B} = \cos \omega t \ (Y \text{ direction})$$

Next, a rotation about an axis slanted by an angle $\theta_1$ from the x-axis in the x-z plane can be realized by the following alternating signals:

$$V_{12A} = B \sin \omega t$$

$$V_{12B} = A \cos \omega t + B \cos \omega t = (A+B) \cos \omega t$$

$$V_{12Z} = A \sin \omega t$$

where $B/A = \tan \theta_1$

A rotation about an axis slanted by an angle $\theta_2$ from the x-axis in the x-y plane can be realized by the following alternating signals:

$$V_{12A} = D \cos \omega t$$

$$V_{12B} = C \cos \omega t$$

$$V_{12Z} = C \sin \omega t + D \sin \omega t = (C+D) \sin \omega t$$

where $D/C = \tan \theta_2$

A rotation about an axis slanted by an angle of $(\theta_1+\theta_2)$ can be realized by the following alternating signals:

$$V_{12A} = B \cos \omega t + C \sin \omega t = \sqrt{(B^2+C^2)} \sin(\omega t + \alpha)$$

$$V_{12B} = A \cos \omega t + C \cos \omega t = (A+C) \cos \omega t$$

$$V_{12Z} = A \sin \omega t + B \sin \omega t = (A+B) \sin \omega t$$

where $B/A = \tan \theta_2$, $B/C = \tan \alpha$, and $C/A = \tan \theta_1$

Next, the vibration type actuator shown in FIGS. 21A and 21B and in FIGS. 24A to 24D is used, and the alternating signals to be supplied to the polarized areas A to D of each piezoelectric element will be described.

Figure 24A:
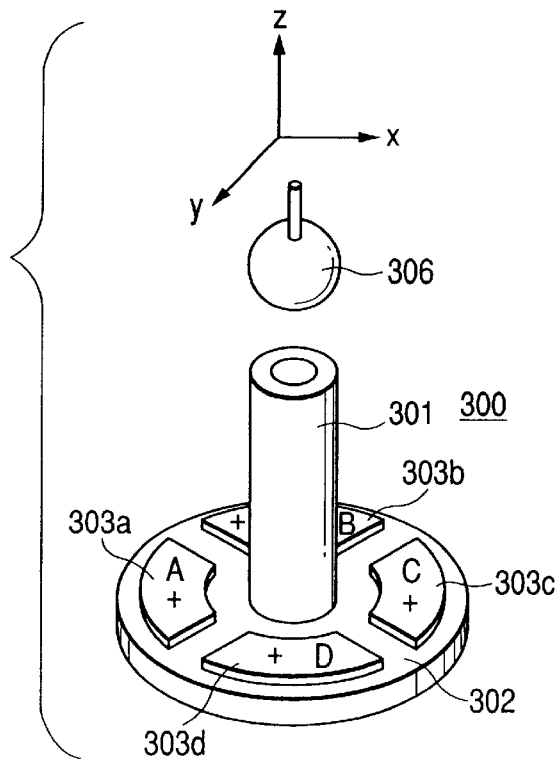
FIGS. 24A, 24B, 24C and 24D illustrate a sixteenth embodiment.
Figure 24B:
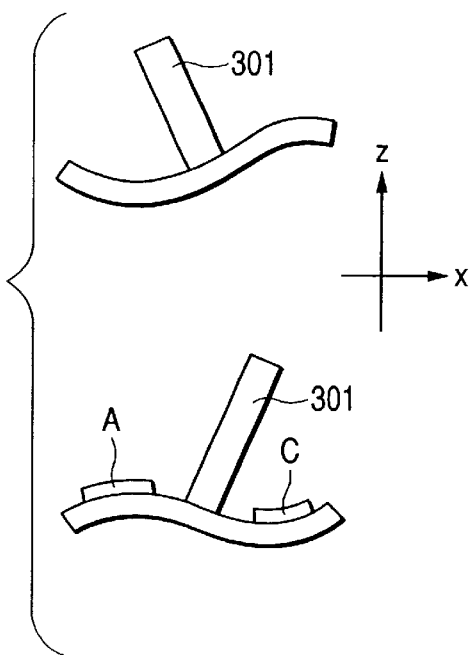
Figure 24C:
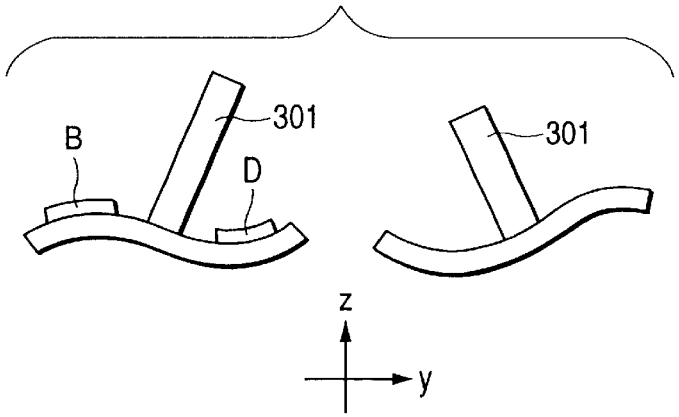
Figure 24D:
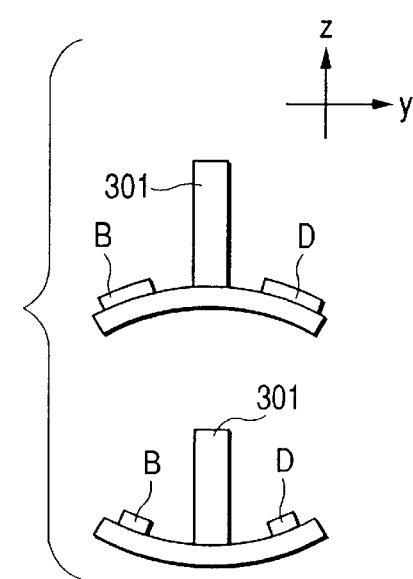

$V_A$ to $V_D$ correspond to the polarized areas A to D in FIG. 21B and to the piezoelectric elements 303a to 303d in FIG. 24A.

A rotation about an axis slanted by an angle of $\theta_1$ from the x-axis in the x-z plane can be realized by the following alternating signals:

$$V_A = A \sin \omega t + B \sin \omega t = (A+B) \sin \omega t$$

$$V_B = A \cos \omega t + B \cos \omega t = (A+B) \cos \omega t$$

$$V_C = A \sin \omega t - B \sin \omega t = (A-B) \sin \omega t$$

$$V_D = A \cos \omega t - B \cos \omega t = -(A+B) \cos \omega t$$

where $B/A = \tan \theta_1$

A rotation about an axis slanted by an angle of $\theta_2$ from the x-axis in the x-y plane can be realized by the following alternating signals:

$$V_A = C \sin \omega t + D \cos \omega t = \sqrt{(C^2+D^2)} \sin(\omega t + \theta_2)$$

$$V_B = C \cos \omega t - D \sin \omega t = \sqrt{(C^2+D^2)} \cos(\omega t + \theta_2)$$

$$V_C = C \sin \omega t - D \cos \omega t = -\sqrt{(C^2+D^2)} \sin(-\omega t + \theta_2)$$

$$V_D = C \cos \omega t + D \sin \omega t = -\sqrt{(C^2+D^2)} \cos(\omega t + \theta_2)$$

where $D/C = \tan \theta_2$

A rotation about an axis slanted by an angle of $(\theta_1+\theta_2)$ can be realized by the following alternating signals:

$$V_A = A\sin\omega t + B\cos\omega t + C\sin\omega t$$
$$= (A+C)\sin\omega t + B\cos\omega t$$
$$= \sqrt{\{(A+C)^2 + B^2\}} \sin(\omega t + \alpha)$$

$$V_B = A\cos\omega t + B\sin\omega t + C\cos\omega t$$
$$= (A+C)\cos\omega t + B\sin\omega t$$
$$= \sqrt{\{(A+C)^2 + B^2\}} \cos(-\omega t + \alpha)$$

$$V_c = A\sin\omega t - B\cos\omega t - C\sin\omega t$$
$$= (A-C)\sin\omega t - B\cos\omega t$$
$$= -\sqrt{\{(A-C)^2 + B^2\}} \sin(-\omega t + \beta)$$

$$V_D = -A\cos\omega t + B\sin\omega t - C\cos\omega t$$
$$= -(A+C)\cos\omega t + B\sin\omega t$$

-continued $$= -\sqrt{\{(A+C)^2 + B^2\}} \cos(\omega t + \alpha)$$

where B/A=tan $\theta_2$, C/A=tan $\theta_1$, tan $\alpha$=B/A+C, and tan $\beta$=B/(A−C)

Figure 30:
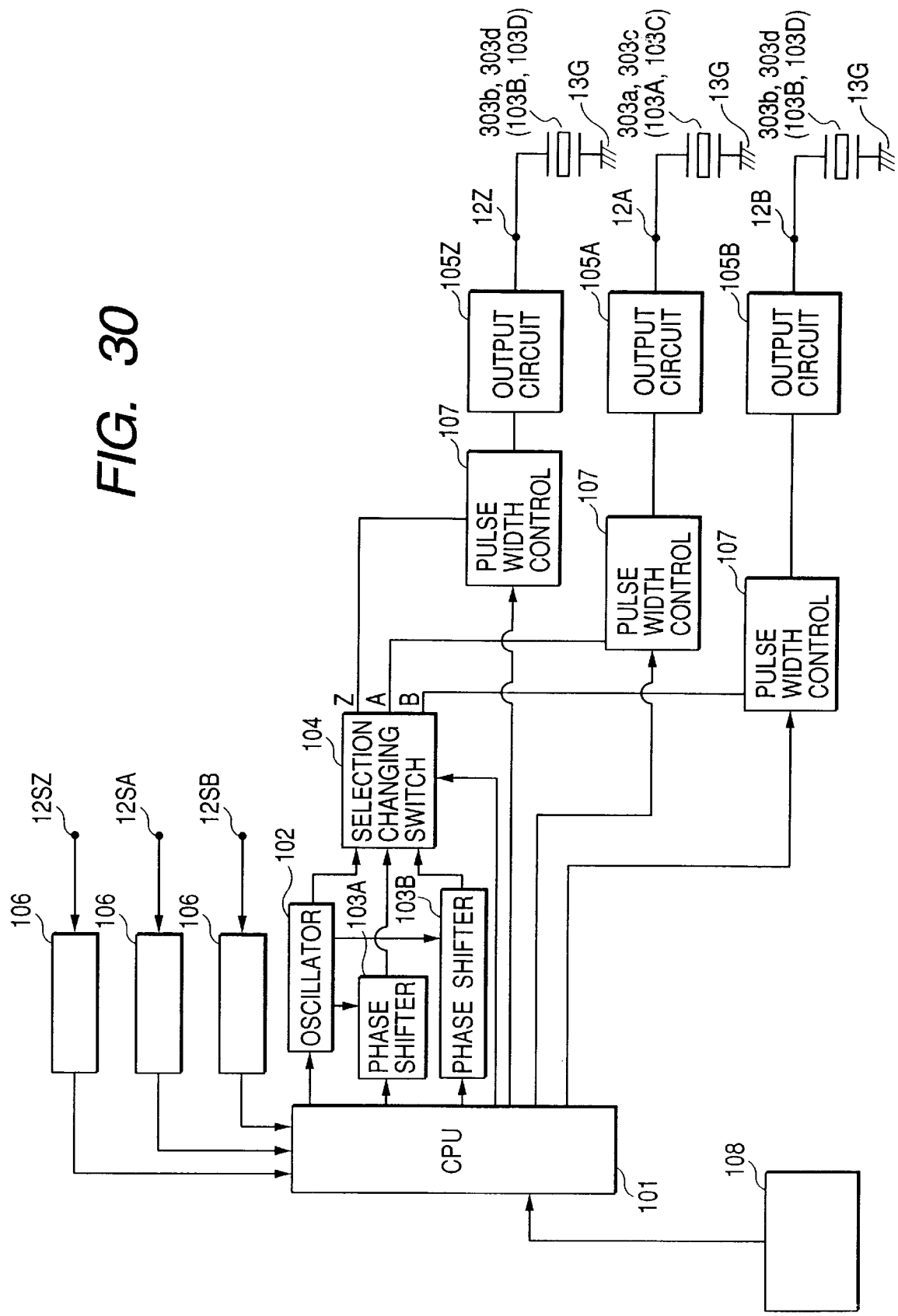
FIG. 30 is a block diagram of a driver circuit of the twentieth embodiment.

FIG. 30 is a block diagram showing a driver circuit for driving the vibration member shown in FIGS. 21A and 21B and FIGS. 24A to 24D.

Reference numeral 101 represents a CPU for controlling the whole system, reference numeral 102 represents an oscillator, reference numerals 103A and 103B represent phase shifters, and reference numeral 104 represents a selection switch.

Reference numerals 105Z, 105A, and 105B represent output circuits for forming drive waveforms. The output circuits 105Z, 105A, and 105B are connected to the polarized areas 303a to 303d and supplies alternating voltages (signals) thereto. These piezoelectric elements excite vibrations in the z-, x-, and y-axis directions.

The vibration amplitude of the vibration member can be changed by setting the oscillation frequency of the oscillator 102 near to or far from the natural frequency of the vibration member.

Reference numeral 107 represents a pulse width controller for controlling a pulse width, the pulse width controller being able to control the amplitude of an alternating voltage to be applied to the piezoelectric element. By controlling the pulse width, the alternating voltage and vibration amplitude can be changed independently for each voltage and amplitude.

The phase shifters 103A and 103B can change the phase of an output signal from the oscillator 102.

By applying three alternating voltages having a voltage and phase difference given by the equations shown in the twentieth embodiment, a rotation about a desired axis can be realized.

Amplitude and phase information of the vibrations in the z-, x- and y-axis directions generated by the piezoelectric element 103 (303) and their voltages corresponding to the vibrations, are supplied as detection signals 12SZ, 12SA, and 12SB from the detection circuits 106 to CPU 101.

In accordance with the supplied information, CPU 101 controls the pulse width controller 107, phase shifters 103A and 103B, and oscillator 102 to thereby control each vibration to have predetermined amplitude and phase difference.

A signal from a rotation detector 108 is fed back to CPU 101 so that the rotation axis and number can be controlled more precisely.

By controlling the pulse width controller 107, phase shifters 103A and 103B, and the like in accordance with the information supplied from the detection circuits 106, the shape of the ellipsoidal locus of vibrations can be controlled as desired.

The following operations become possible by the above control.
1. Since a speed distribution of the vibration member changes in a motion direction, the speed of the moving member can be changed.
2. Since a friction force distribution changes, it is possible to form an ellipsoidal locus having a minimum friction loss. For example, as to the inclination of the ellipsoidal locus, the axes of the ellipsoidal locus are controlled to perpendicularly intersect with the spherical surface of the moving member. Specifically, it is possible to improve an efficiency by generating the ellipsoidal locus in a radial direction of the inner circumferential surface 100a (oblique to the axial direction) of the elastic member 100 shown in FIG. 21A.

Alternatively, it is possible to drive the vibration member in the state of the ellipsoidal locus having a maximum efficiency, by feeding back signals from unrepresented rotation detector and power meter.
3. Since the contact state (displacement and speed in a normal direction) of the moving member and vibration member also changes, the ellipsoidal locus can be formed which provides a contact state with a minimum impact or does not generate abnormal noises such as flutter sounds.

Obviously, the vibration type actuators of the fourteenth to twentieth embodiments described above may be replaced by the vibration type actuators shown in FIGS. 13 to 15.

Although the origins of the x- and y-axes are set to the center of the polarized areas of the piezoelectric element as shown in FIG. 21B, it is not intended to be limited thereto.

The vibration member may be moved relative to the moving member.

According to the embodiments described above, it is possible to provide a relative motion in a desired direction between the vibration member and moving member. Since a single vibration member is used, the space of an actuator can be saved. A relative motion between the vibration member and contact member can be set to any direction, for example, not only rotation about the x-, y-, and z-axis directions but also motion in an oblique direction, so that the application field of the invention can be widened greatly.

In addition, simplification of the arrangement of electromechanical energy conversion element itself, reduction of the necessary space and easily signal applying means, e.g., line arrangement, are achieved by the embodiments.

Further, since the contact surface of the vibration member can drive a spherical contact member, the contact member can be moved at a multi-degree of freedom so long as the contact member has a partial spherical area.

Still further, the vibration member can be supported without adversely affecting vibrations excited in the vibration member.

Furthermore, a compact vibration type driving apparatus using a multi-degree of freedom vibration type actuator can be realized. It is therefore possible to perform fine operations of a medical apparatus or the like to be used in a small space hard to be accessed by human hands.

Further, since the moving member is made in pressure contact with the contact member by using pressuring means, a pressure contact therebetween can be reliably maintained.

Still further, the contact member is made in contact with the vibration member by a constant suction force, the moving member can be driven under a stable pressure force.

It is also possible to reliably suck air and make the contact member be sucked and pressured against the vibration member.

Further, since the contact member can be pressured against the vibration member at a positive pressure, the pressure force is controlled easily. It is also possible to prevent dusts or the like from reaching the contact area between the contact member and vibration member by using a holding member. Since the holding member is allowed to move at one degree of freedom, the motion at other degrees of freedom can be made easy correspondingly.

Still further, by adjusting the phase difference of at least one type of vibrations among three types of vibrations in use in accordance with the angle of the driving surface, the angle of vibrations of the vibration member can be changed so that an ellipsoidal motion suitable for driving the contact member can be generated on the vibration member.

Since the natural frequencies of longitudinal and traverse vibration of the vibration member become coincident with each other, an ellipsoidal motion can be produced on each point of the vibration member in three planes intersecting at a right angle. By coupling the contact member to the ellipsoidal motion on each point of the vibration member, the contact member can perform a motion of a multi-degree of freedom. Since the single vibration member is used, the space of the actuator can be saved and it is not necessary to make a plurality of vibration members have the same characteristics as in the conventional case.

Still further, it is possible to lower the natural frequency of longitudinal vibrations of the vibration member, and to make the natural frequencies of longitudinal and traverse vibrations generally coincident.

Further, by adjusting the natural frequency of mainly traverse vibrations, the natural frequencies of the primary longitudinal vibration mode and secondary traverse vibration mode can be made generally coincident. Therefore, a multi-degree of freedom vibration type actuator can be realized which utilizes the primary longitudinal vibration mode and secondary traverse vibration mode of the vibration member.

Further, by adjusting the natural frequency of mainly longitudinal vibrations, the natural frequencies of the primary longitudinal vibration mode and secondary traverse vibration mode can be made generally coincident. Therefore, a multi-degree of freedom vibration type actuator can be realized which utilizes the primary longitudinal vibration mode and secondary traverse vibration mode of the vibration member.

What is claimed is:

1. A vibration type driving apparatus comprising:
   a plurality of elastic members;
   a moving member contacting one of said plurality of elastic members; and
   an electro-mechanical energy conversion element fixedly sandwiched between adjacent ones of said plurality of elastic members and arranged to generate in said one of said plurality of elastic members two flexural vibrations having respective displacement directions that are substantially perpendicular to each other and a longitudinal vibration having a displacement direction that is substantially perpendicular to the displacement directions of the two flexural vibrations,
      wherein said electro-mechanical energy conversion element excites two or more vibrations of said flexural and longitudinal vibrations so as to move said moving member.

2. An apparatus according to claim 1, wherein said one of said plurality of elastic members includes a portion having a reduced rigidity to enhance vibration displacements of flexural vibrations and a portion having a reduced rigidity to enhance vibration displacements of a longitudinal vibration.

3. An apparatus according to claim 1, further comprising:
   a cover member that covers said plurality of elastic members and said moving member; and
   a pressing member provided on said cover member, that maintains said moving member in press contact with said one of said plurality of elastic members.

4. A vibration type driving apparatus comprising:
   a columnar elastic member;
   a moving member contacting said elastic member; and
   an electro-mechanical energy conversion element provided on an exterior side surface of said elastic member and generating in said elastic member two flexural vibrations having respective displacement directions that are substantially perpendicular to each other and a longitudinal vibration having a displacement direction that is substantially perpendicular to the displacement directions of the two flexural vibrations,
      wherein said electro-mechanical energy conversion element excites two or more vibrations of the longitudinal vibration and the two flexural vibrations so as to move said moving member.

5. A vibration type driving apparatus comprising:
   a plate-shaped elastic member;
   a columnar elastic member projecting from a surface of said plate-shaped elastic member, said columnar elastic member comprising an electro-mechanical energy conversion element fixedly sandwiched by first and second portions of said columnar elastic member, said electro-mechanical energy conversion element generating in said columnar elastic member two flexural vibrations having respective displacement directions that are substantially perpendicular to each other; and
   a plurality of electro-mechanical energy conversion elements provided on a plane of said plate-shaped elastic member so as to position said columnar elastic member at a center of positions of said plurality of electro-mechanical energy conversion elements, and generate a vibration having a displacement direction that is substantially perpendicular to the displacement directions of the two flexural vibrations.

6. An apparatus according to claim 5, wherein said electro-mechanical energy conversion element excites two or more vibrations at the same time from among the two vibrations having respective displacement directions that are parallel to the displacement directions of two flexural vibrations and are substantially perpendicular to each other and the vibration having a displacement direction that is substantially perpendicular to the displacement directions of the two flexural vibrations.

7. An apparatus according to claim 5, wherein vibrations generated by said plate-shaped elastic member and said columnar elastic member are flexural vibrations.

8. A vibration type driving apparatus comprising:
   a plate-shaped elastic member; and
   a driving member projecting from a surface of said plate-shaped elastic member; and
   electro-mechanical energy conversion means for generating in said plate-shaped elastic member two vibrations having respective displacement directions that are parallel with the surface of said plate-shaped elastic member and substantially perpendicular to each other, and for generating a vibration having a displacement direction that is substantially perpendicular to the surface of said plate-shaped elastic member;
      wherein said electro-mechanical energy conversion means comprises a plurality of electro-mechanical energy conversion elements provided on a plane of said plate-shaped elastic member so as to position said driving member at a center of positions of said plurality of electro-mechanical energy conversion elements.

9. An apparatus according to claim 8, wherein said electro-mechanical energy conversion means excites two or more vibrations at the same time among the two vibrations having respective displacement directions that are parallel to the surface of said plate-shaped elastic member and substantially perpendicular to each other and the vibration having a displacement direction that is substantially perpendicular to the surface of said plate-shaped elastic member.

10. An apparatus according to claim 8, wherein the vibrations generated by said plate-shaped elastic member are flexural vibrations.

11. A vibration type driving apparatus comprising:

a plate-shaped elastic member;

a plurality of electro-mechanical energy conversion elements respectively provided on four areas obtained by dividing a plane of said plate-shaped elastic member with respect to a certain point; and a driving member provided on said plate-shaped elastic member at a point between said plurality of electro-mechanical energy conversion elements, wherein said plurality of electro-mechanical energy conversion elements generates two vibrations having respective displacement directions that are parallel with the plane and perpendicular to each other and a vibration having a displacement direction that is perpendicular to the plane, and said plurality of electro-mechanical energy conversion elements excites the two vibrations having respective displacement directions that are parallel with the plane and perpendicular to each other and the vibration having a displacement direction that is perpendicular to the plane so as to cause said driving member to move in a circular or ellipsoidal manner.

12. A vibration type driving apparatus comprising:

an elastic member capable of generating three vibrations having respective displacement directions that are substantially perpendicular to each other;

a moving member contacting said elastic member; and a pressing mechanism that maintains said elastic member in press contact with said moving member by magnetic force, wherein said elastic member excites two or more vibrations at the same time to move said moving member.

13. A vibration type driving apparatus comprising:

an elastic member capable of generating therein three vibrations having respective displacement directions that are substantially perpendicular to each other;

a moving member contacting said elastic member; and a pressing mechanism that maintains said elastic member in press contact with said moving member by vacuum force, wherein said elastic member excites two or more vibrations at the same time to move said moving member.

* * * * *

UNITED STATES PATENT AND TRADEMARK OFFICE
CERTIFICATE OF CORRECTION

PATENT NO. : 6,404,104 B1
DATED : June 11, 2002
INVENTOR(S) : Takashi Maeno et al.

It is certified that error appears in the above-identified patent and that said Letters Patent is hereby corrected as shown below:

Column 1,
Line 29, "9b" should read -- 19b --.
Line 52, "V9-K15." should read -- K9-K15. --.

Column 11,
Line 47, "patient" should read -- patient's --.
Line 49, "patient" should read -- patient's --.
Line 53, "the" should be deleted.

Column 12,
Line 42, "$V_A=V_BV_C=V_D=\sin \omega t$" should read -- $V_A=V_B=V_C=V_D=\sin \omega t$ --.

Column 13,
Line 1, "servers" should read -- serves --.
Line 5, "servers" should read -- serves --.
Line 23, "$V_B=\cos \omega t, V=-\cos \omega t$" should read -- $V_B=\cos \omega t, V_D=-\cos \omega t$ --.
Line 42, "$V_A=\sin \omega t, V_C=\sin \omega t$" should read -- $V_A=\sin \omega t, V_C=-\sin \omega t$ --.

Column 14,
Line 2, "followings." should read -- following. --.
Line 18, "$V_D=\sin \omega t$" should read -- $V_D=-\sin \omega t$ --.

Column 18,
Line 8, "$\omega t=\sqrt{B^2+{}^{C2}}$" should read -- $\omega t=\sqrt{B^2+C^2}$ --.
Line 10, "$(\omega t=(A+C)$" should read -- $\omega t=(A+C)$ --.
Line 31, "$V_D=A \cos \omega t$" should read -- $V_D=-A \cos \omega t$ --.
Line 38, "$\sqrt{(C^2+D^2)}\sin \omega t+\theta_2)$" should read -- $\sqrt{(C^2+D^2)}\sin(\omega t+\theta_2)$ --.
Line 40, "$\sqrt{(C^2+D^2)}\cos \omega t+\theta_2)$" should read -- $\sqrt{(C^2+D^2)}\cos(\omega t+\theta_2)$ --.
Line 42, "$\sqrt{(C^2+D^2)}$" should read -- $\sqrt{(C^2+D^2)}$ --.
Line 44, "$V_D=C \cos$" should read -- $V_D=-C \cos$ --, and "$\sqrt{(C^2+D^2)}$" should read -- $\sqrt{(C^2+D^2)}$ --.

Column 19,
Line 5, "$\tan \alpha=B/A+C$," should read -- $\tan \alpha=B/(A+C)$ --.
Line 18, "supplies" should read -- supply --.

UNITED STATES PATENT AND TRADEMARK OFFICE
CERTIFICATE OF CORRECTION

PATENT NO.    : 6,404,104 B1
DATED         : June 11, 2002
INVENTOR(S)   : Takashi Maeno et al.

It is certified that error appears in the above-identified patent and that said Letters Patent is hereby corrected as shown below:

<u>Column 20,</u>
Line 31, "easily" should read -- easy --.

Signed and Sealed this

Twenty-sixth Day of November, 2002

*Attest:*

JAMES E. ROGAN
*Attesting Officer*  *Director of the United States Patent and Trademark Office*